United States Patent
Cha et al.

(10) Patent No.: US 12,739,775 B2
(45) Date of Patent: Sep. 15, 2026

(54) METHOD FOR TRANSMITTING AND RECEIVING SIGNAL IN WIRELESS COMMUNICATION SYSTEM, AND APPARATUS SUPPORTING SAME

(71) Applicant: LG ELECTRONICS INC., Seoul (KR)

(72) Inventors: Hyunsu Cha, Seoul (KR); Byounghoon Kim, Seoul (KR); Kijun Kim, Seoul (KR); Jeongsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 670 days.

(21) Appl. No.: 18/021,489

(22) PCT Filed: Oct. 12, 2021

(86) PCT No.: PCT/KR2021/014018
§ 371 (c)(1),
(2) Date: Feb. 15, 2023

(87) PCT Pub. No.: WO2022/080818
PCT Pub. Date: Apr. 21, 2022

(65) Prior Publication Data

US 2023/0328680 A1 Oct. 12, 2023

(30) Foreign Application Priority Data

Oct. 12, 2020 (KR) ........................ 10-2020-0130787

(51) Int. Cl.
*H04W 64/00* (2009.01)
*H04L 5/00* (2006.01)
(Continued)

(52) U.S. Cl.
CPC ........... *H04W 64/00* (2013.01); *H04L 5/0051* (2013.01); *H04W 24/10* (2013.01); *H04W 56/0015* (2013.01)

(58) Field of Classification Search
CPC .... H04W 64/00; H04W 24/10; H04W 64/006
(Continued)

(56) References Cited

U.S. PATENT DOCUMENTS

| | | | | |
|---|---|---|---|---|
| 6,154,500 | A * | 11/2000 | Dorenbosch | H04L 27/2657 375/259 |
| 8,774,621 | B2 * | 7/2014 | Mukai | H04B 10/07 398/71 |

(Continued)

FOREIGN PATENT DOCUMENTS

| | | | | |
|---|---|---|---|---|
| EP | 2611080 | A1 * | 7/2013 | H04Q 11/0067 |
| EP | 2611080 | B1 * | 8/2016 | H04B 10/07 |

(Continued)

OTHER PUBLICATIONS

Z. Zhou et al., "WiFi-Based Indoor Line-of-Sight Identification," in IEEE Transactions on Wireless Communications, vol. 14, No. 11, pp. 6125-6136, Nov. 2015, doi: 10.1109/TWC.2015.2448540 (Year: 2015).*

*Primary Examiner* — William D Cumming
(74) *Attorney, Agent, or Firm* — BRYAN CAVE LEIGHTON PAISNER LLP

(57) ABSTRACT

According to at least one embodiment, a user equipment (UE) may receive configuration information for positioning, perform measurement for positioning reference signals (PRSs) from transmission points (TPs) based on the configuration information, and transmit a measurement report based on the measurement for the PRSs, the configuration information may include information related to a line-of-sight (LoS) identification window, and the measurement
(Continued)

report may include information related to whether the measurements are performed based on the LoS identification window.

10 Claims, 18 Drawing Sheets

(51) Int. Cl.
*H04W 24/10* (2009.01)
*H04W 56/00* (2009.01)

(58) Field of Classification Search
USPC .......................................................... 375/259
See application file for complete search history.

(56) References Cited

U.S. PATENT DOCUMENTS

| | | | | |
|---|---|---|---|---|
| 11,016,198 | B2 * | 5/2021 | Barnes | H04H 20/02 |
| 12,184,356 | B2 * | 12/2024 | Zirwas | H04B 7/063 |
| 2008/0143603 | A1 | 6/2008 | Bornholdt | |
| 2013/0045010 | A1 * | 2/2013 | Mukai | H04J 3/0688 398/52 |
| 2016/0327650 | A1 * | 11/2016 | Barnes | G01S 19/45 |
| 2021/0247520 | A1 * | 8/2021 | Barnes | H04B 7/18523 |
| 2022/0124664 | A1 * | 4/2022 | Cha | H04W 64/00 |
| 2023/0006713 | A1 * | 1/2023 | Zirwas | H04B 7/063 |
| 2023/0328680 | A1 * | 10/2023 | Cha | H04W 24/10 |
| 2023/0345407 | A1 * | 10/2023 | Li | G01S 5/0036 |
| 2024/0224225 | A1 * | 7/2024 | Momani | H04W 64/006 |
| 2024/0243782 | A1 * | 7/2024 | Ibrahim | H04B 7/088 |
| 2024/0421862 | A1 * | 12/2024 | Choi | H04B 7/0473 |
| 2025/0052851 | A1 * | 2/2025 | Wang | H04B 7/0639 |
| 2025/0142518 | A1 * | 5/2025 | Li | G01S 5/10 |
| 2025/0309947 | A1 * | 10/2025 | Choi | H04B 7/06954 |
| 2025/0317168 | A1 * | 10/2025 | Song | H04B 7/0456 |

FOREIGN PATENT DOCUMENTS

| | | | | |
|---|---|---|---|---|
| EP | 4049376 B1 * | 2/2025 | H04B 7/063 |
| KR | 101774153 | 9/2017 | |
| KR | 20190060834 | 6/2019 | |
| KR | 20200100005 | 8/2020 | |
| WO | WO-2012070089 A1 * | 5/2012 | H04J 3/0688 |
| WO | WO-2016177854 A1 * | 11/2016 | G01S 19/071 |
| WO | 2020167046 | 8/2020 | |
| WO | WO-2021116831 A1 * | 6/2021 | H04B 7/063 |
| WO | WO-2022080818 A1 * | 4/2022 | H04B 17/309 |

* cited by examiner

FIG. 28

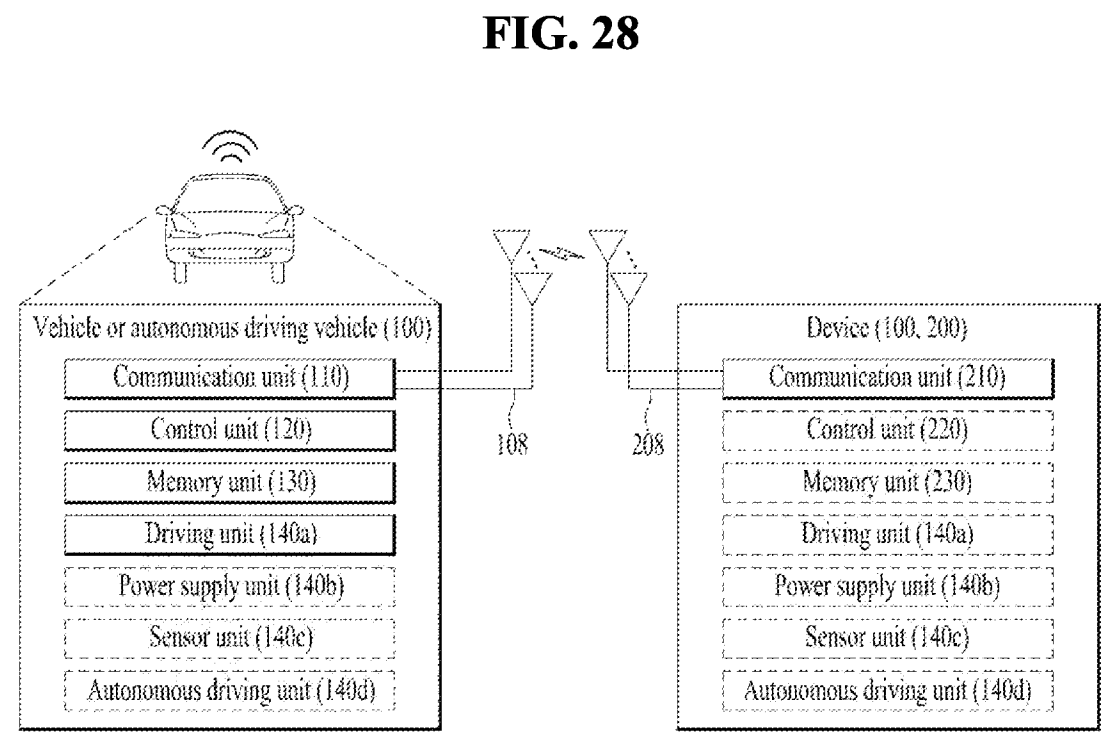

Vehicle or autonomous driving vehicle (100)
Communication unit (110)
Control unit (120)
Memory unit (130)
Driving unit (140a)
Power supply unit (140b)
Sensor unit (140c)
Autonomous driving unit (140d)

108

208

Device (100, 200)
Communication unit (210)
Control unit (220)
Memory unit (230)
Driving unit (140a)
Power supply unit (140b)
Sensor unit (140c)
Autonomous driving unit (140d)

METHOD FOR TRANSMITTING AND RECEIVING SIGNAL IN WIRELESS COMMUNICATION SYSTEM, AND APPARATUS SUPPORTING SAME

This application is the National Stage filing under 35 U.S.C. 371 of International Application No. PCT/KR2021/014018 filed on Oct. 12, 2021, which claims priority to Korean Patent Application No. 10-2020-0130787 filed on Oct. 12, 2020, the contents of which are all hereby incorporated by reference herein in their entirety.

TECHNICAL FIELD

Various embodiments are related to a wireless communication system.

BACKGROUND

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a positioning method based on timing measurement and an apparatus supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method of transmitting and receiving a signal in a wireless communication system and apparatus for supporting the same.

According to various embodiments, a method performed by a user equipment (UE) in a wireless communication system may be provided.

According to various embodiments, the method may include: receiving configuration information for positioning; receiving a plurality of reference signals (RSs) for the positioning from a plurality of transmission points (TPs) based on the configuration information; and transmitting measurement information in response to the plurality of RSs.

According to various embodiments, the method may further include determining whether a measurement obtained based on one or more RSs received from a specific TP among the plurality of TPs is related to a line-of-sight (LoS) signal path, depending on whether the measurement is included in a LOS identification window, to transmit the measurement information.

According to various embodiments, the LoS identification window may be obtained based on the specific TP and a reference for the LoS identification window.

According to various embodiments, the reference may include at least one of: one or more reference TPs configured among the plurality of TPs; one or more reference RS resource sets configured among a plurality of RS resource sets related to the plurality of RSs; or one or more reference RS resources configured among a plurality of RS resources related to the plurality of RSs.

According to various embodiments, based on the reference including one or more reference TPs configured among the plurality of TPs, the LoS identification window may include one or more LOS identification windows respectively related to the one or more reference TPs.

According to various embodiments, the one or more LoS identification windows may be obtained based on distances from the specific TP to the one or more reference TPs, respectively.

According to various embodiments, the method may further include receiving information on a time synchronization error between two TPs among the plurality of TPs.

According to various embodiments, the LoS identification window may be obtained based on the time synchronization error.

According to various embodiments, based on the measurement being included in the LoS identification window, the measurement may be determined to be related to the LoS signal path.

According to various embodiments, based on the measurement not being included in the LoS identification window, the measurement may be determined to be related to a non-line-of-sight (NLoS) signal path.

According to various embodiments, based on the determination that the measurement is related to the LoS signal path, the measurement information may include the measurement.

According to various embodiments, based on the determination that the measurement is related to the NLOS signal path, the measurement information may not include the measurement.

According to various embodiments, a UE configured to operate in a wireless communication system may be provided.

According to various embodiments, the UE may include: a transceiver; and at least one processor connected to the transceiver.

According to various embodiments, the at least one processor may be configured to: receive configuration information for positioning; receive a plurality of RSs for the positioning from a plurality of TPs based on the configuration information; and transmit measurement information in response to the plurality of RSs.

According to various embodiments, the at least one processor may be configured to determine whether a measurement obtained based on one or more RSs received from a specific TP among the plurality of TPs is related to a LOS signal path, depending on whether the measurement is included in a LOS identification window, to transmit the measurement information.

According to various embodiments, the LoS identification window may be obtained based on the specific TP and a reference for the LoS identification window.

According to various embodiments, the reference may include at least one of: one or more reference TPs configured among the plurality of TPs; one or more reference RS resource sets configured among a plurality of RS resource sets related to the plurality of RSs; or one or more reference RS resources configured among a plurality of RS resources related to the plurality of RSs.

According to various embodiments, based on the reference including one or more reference TPs configured among the plurality of TPs, the LoS identification window may include one or more LoS identification windows respectively related to the one or more reference TPs.

According to various embodiments, the one or more LOS identification windows may be obtained based on distances from the specific TP to the one or more reference TPs, respectively.

According to various embodiments, the at least one processor may be configured to receive information on a time synchronization error between two TPs among the plurality of TPs.

According to various embodiments, the LoS identification window may be obtained based on the time synchronization error.

According to various embodiments, the at least one processor may be configured to communicate with at least one of a mobile terminal, a network, or an autonomous vehicle other than a vehicle including the UE.

According to various embodiments, a method performed by a TP in a wireless communication system may be provided.

According to various embodiments, the method may include: transmitting configuration information for positioning; transmitting one or more RSs related to the configuration information; and receiving measurement information in response to the one or more RSs.

According to various embodiments, whether a measurement obtained based on one or more RSs received from a specific TP among a plurality of TPs including the TP is related to a LoS signal path may be determined depending on whether the measurement is included in a LoS identification window.

According to various embodiments, the LoS identification window may be obtained based on the specific TP and a reference for the LoS identification window.

According to various embodiments, a TP configured to operate in a wireless communication system may be provided.

According to various embodiments, the TP may include: a transceiver; and at least one processor connected to the transceiver.

According to various embodiments, the at least one processor may be configured to: transmit configuration information for positioning; transmit one or more RSs related to the configuration information; and receive measurement information in response to the one or more RSs.

According to various embodiments, whether a measurement obtained based on one or more RSs received from a specific TP among a plurality of TPs including the TP is related to a LoS signal path may be determined depending on whether the measurement is included in a LoS identification window.

According to various embodiments, the LoS identification window may be obtained based on the specific TP and a reference for the LoS identification window.

According to various embodiments, an apparatus configured to operate in a wireless communication system may be provided.

According to various embodiments, the apparatus may include: at least one processor; and at least one memory operably coupled to the at least one processor and configured to store one or more instructions that, based on execution, cause the at least one processor to perform operations.

According to various embodiments, the operations may include: receiving configuration information for positioning; receiving a plurality of RSs for the positioning from a plurality of TPs based on the configuration information; and transmitting measurement information in response to the plurality of RSs.

According to various embodiments, the method may further include determining whether a measurement obtained based on one or more RSs received from a specific TP among the plurality of TPs is related to a LoS signal path, depending on whether the measurement is included in a LoS identification window, to transmit the measurement information.

According to various embodiments, the LoS identification window may be obtained based on the specific TP and a reference for the LoS identification window.

According to various embodiments, a non-transitory processor-readable medium configured to store one or more instructions that cause at least one processor to perform operations may be provided.

According to various embodiments, the operations may include: receiving configuration information for positioning; receiving a plurality of RSs for the positioning from a plurality of TPs based on the configuration information; and transmitting measurement information in response to the plurality of RSs.

According to various embodiments, the method may further include determining whether a measurement obtained based on one or more RSs received from a specific TP among the plurality of TPs is related to a LoS signal path, depending on whether the measurement is included in a LoS identification window, to transmit the measurement information.

According to various embodiments, the LoS identification window may be obtained based on the specific TP and a reference for the LoS identification window.

It will be understood by those skilled in the art that the above-described embodiments are merely part of various embodiments of the present disclosure, and various modifications and alternatives could be developed from the following technical features of the present disclosure.

Advantageous Effects

According to various embodiments, a signal may be effectively transmitted and received in a wireless communication system.

According to various embodiments, positioning may be effectively performed in a wireless communication system.

According to various embodiments, positioning accuracy may be improved.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

BRIEF DESCRIPTION OF THE DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 28 illustrates an exemplary vehicle or autonomous vehicle to which various embodiments are applied.

DETAILED DESCRIPTION

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System

1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
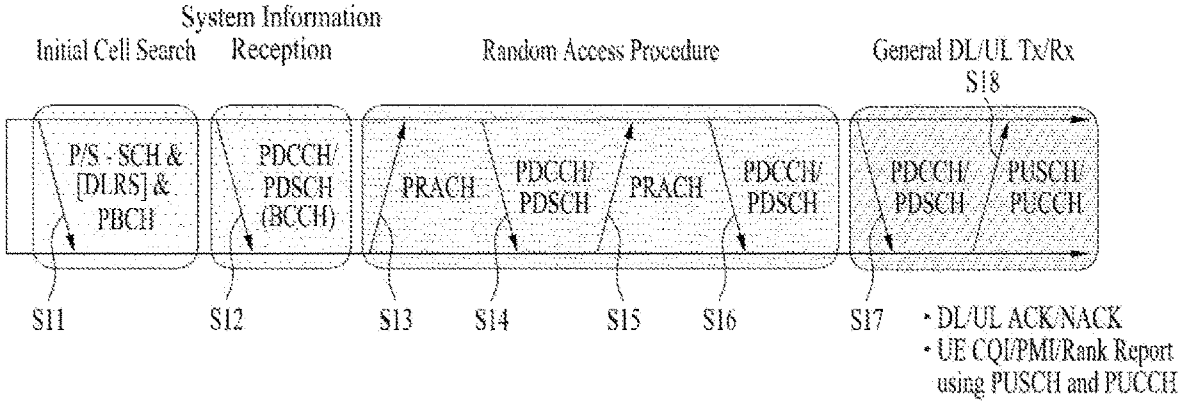
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resources

Figure 2:
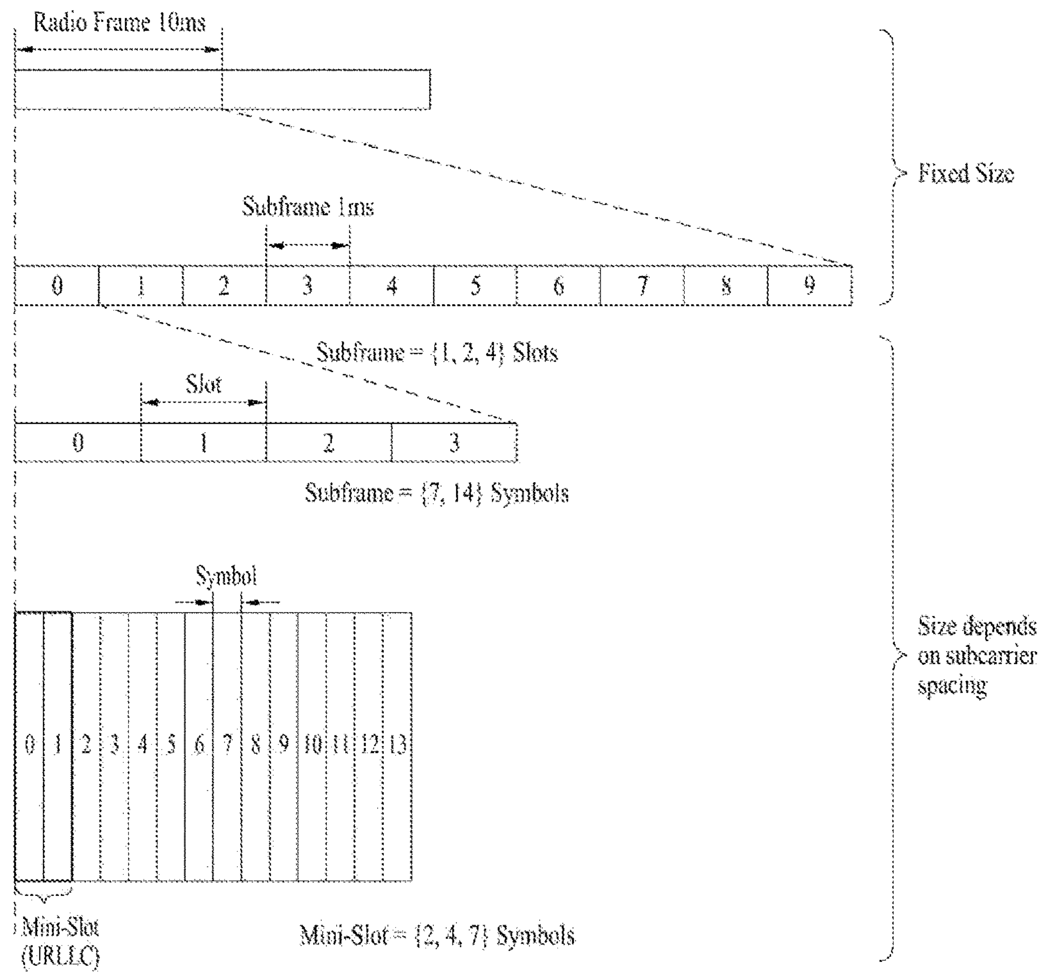
FIG. 2 is a diagram illustrating a radio frame structure in a new radio access technology (NR) system to which various embodiments are applicable.

FIG. 2 illustrates an NR system based radio frame structure which can be used for various embodiments.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, u and a CP are obtained from RRC parameters provided by the BS.

TABLE 1

| μ | $\Delta f = 2^{\mu} \cdot 15$[KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHZ range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, Tc=1/(Δfmax*Nf) where Δfmax=480*103 Hz and a value Nf related to a fast Fourier transform (FFT) size or an inverse fast Fourier transform (IFFT) size is given as Nf=4096. Tc and Ts which is an LTE-based time unit and sampling time, given as Ts=1/((15 kHz)*2048) are placed in the following relationship: Ts/Tc=64. DL and UL transmissions are organized into (radio) frames each having a duration of Tf=(Δfmax*Nf/100)*Tc=10 ms. Each radio frame includes 10 subframes each having a duration of Tsf=(Δfmax*Nf/1000)*Tc=1 ms. There may exist one set of frames for UL and one set of frames for DL. For a numerology u, slots are numbered with nμs∈{0, . . . ,Nslot,μsubframe−1} in an increasing order in a subframe, and with nμs,f∈{0, . . . ,Nslot,μframe−1} in an increasing order in a radio frame. One slot includes Nμsymb consecutive OFDM symbols, and Nμsymb depends on a CP. The start of a slot nus in a subframe is aligned in time with the start of an OFDM symbol nus*Nμsymb in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, Nslotsymb represents the number of symbols in a slot, Nframe,μslot represents the number of slots in a frame, and Nsubframe,μslot represents the number of slots in a subframe.

In the NR system to which various embodiments are applicable, different OFDM (A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 2, which is exemplary, and the number of slot(s) which may be included in one subframe is defined as listed in Table 6 or Table 7.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
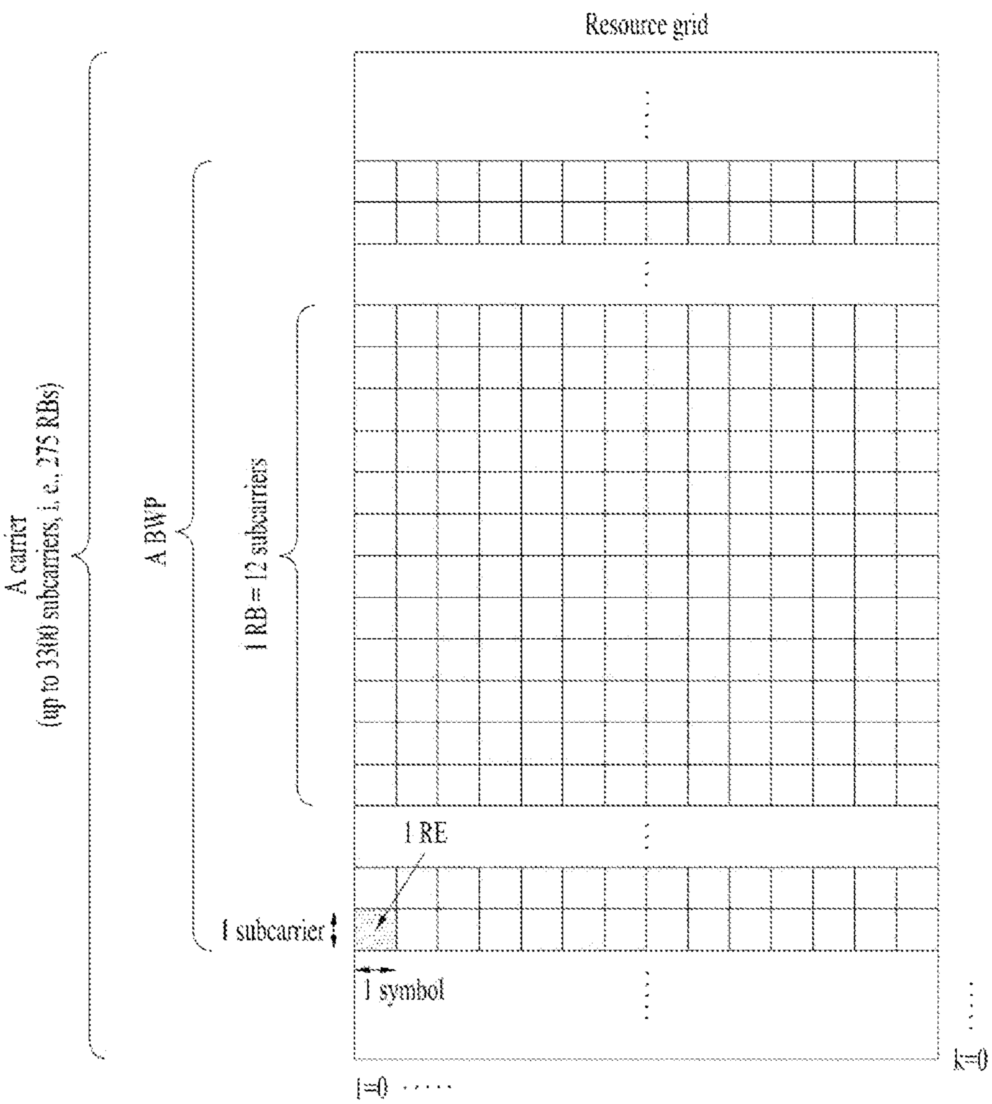
FIG. 3 illustrates an exemplary resource grid to which various embodiments are applicable.

FIG. 3 illustrates an exemplary resource grid to which various embodiments are applicable.

Referring to FIG. 3, for each subcarrier spacing (SCS) and carrier, a resource grid is defined as $14\times2^{\mu}$ OFDM symbols by $$N_{grid}^{size,\mu}\times N_{SC}^{RB}$$

subcarriers, where $$N_{grid}^{size,\mu}$$

is indicated by RRC signaling from the BS.

$$N_{grid}^{size,\mu}$$

may vary according to an SCS configuration μ and a transmission direction, UL or DL. There is one resource grid for an SCS configuration μ, an antenna port p, and a transmission direction (UL or DL). Each element of the resource grid for the SCS configuration u and the antenna port p is referred to as an RE and uniquely identified by an index pair (k, l) where k represents an index in the frequency domain, and l represents a symbol position in the frequency domain relative to a reference point. The RE (k, l) for the SCS configuration u and the antenna port p corresponds to a physical resource and a complex value $$a_{k,l}^{(p,\mu)}.$$

An RB is defined as $$N_{SC}^{RB}=12$$

consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
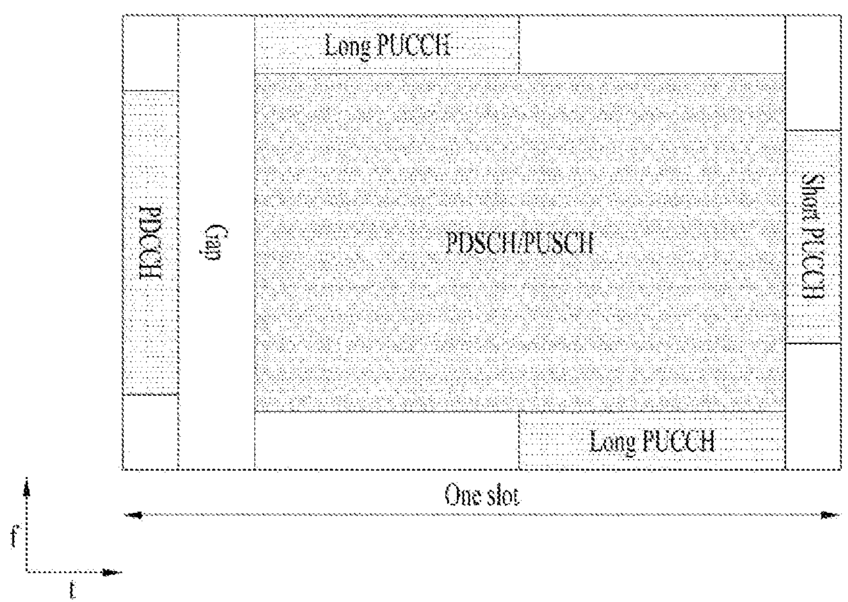
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P) RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 5:
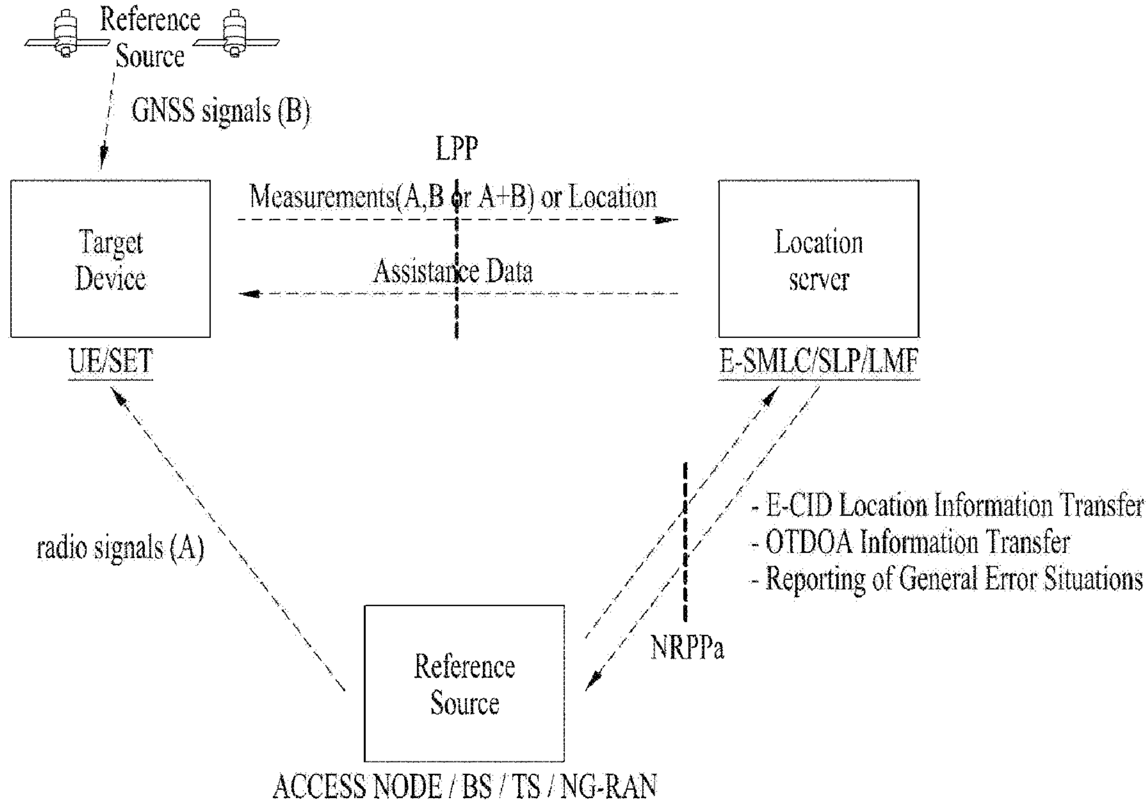
FIG. 5 is a diagram illustrating a positioning protocol configuration for positioning a user equipment (UE), to which various embodiments are applicable.

FIG. 5 is a diagram illustrating an exemplary positioning protocol configuration for positioning a UE, to which various embodiments are applicable.

Referring to FIG. 5, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

- E-CID Location Information Transfer. This function allows the reference source to exchange location information with the LMF for the purpose of E-CID positioning.
- OTDOA Information Transfer. This function allows the reference source to exchange information with the LMF for the purpose of OTDOA positioning.
- Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0,1, . . . ) may be defined by Equation 1.

$$r(m) = \frac{1}{\sqrt{2}}(1-2c(m)) + j\frac{1}{r_2}(1-2c(m+1)) \quad \text{[Equation 1]}$$

c(i) may be a pseudo-random sequence. A pseudo-random sequence generator may be initialized by Equation 2.

$$c_{init} = \left(2^{22}\left\lfloor \frac{n_{ID,seq}^{PRS}}{1024} \right\rfloor + 2^{10}\left(N_{symb}^{slot} n_{s,f}^{\mu} + l + 1\right)\left(2\left(n_{ID,seq}^{PRS} \bmod 1024\right) + 1\right) + \left(n_{ID,seq}^{PRS} \bmod 1024\right)\right) \bmod 2^{31} \quad \text{[Equation 2]}$$

$$n_{s,f}^{\mu}$$

may be a slot number in a frame in an SCS configuration u. A DL PRS sequence ID $$n_{IDseq}^{PRS} \in \{0, 1, \ldots, 4095\}$$

may be given by a higher-layer parameter (e.g., DL-PRS-SequenceId). l may be an OFDM symbol in a slot to which the sequence is mapped.

Mapping to Physical Resources in a DL PRS Resource

A PRS sequence r(m) may be scaled by $\beta_{PRS}$ and mapped to REs $(k, l)_{p,\mu}$, specifically by Equation 3. $(k, l)_{p,\mu}$ may represent an RE (k, l) for an antenna port p and the SCS configuration u.

$$a_{k,l}^{(p,\mu)} = \beta_{PRS} r(m) \quad \text{[Equation 3]}$$

$$m = 0, 1, \ldots$$

$$k = mK_{comb}^{PRS} + \left(\left(k_{offset}^{PRS} + k'\right) \bmod K_{comb}^{PRS}\right)$$

$$l = l_{start}^{PRS}, l_{start}^{PRS} + 1, \ldots, l_{start}^{PRS} + L_{PRS} - 1$$

Herein, the following conditions may have to be satisfied:

The REs $(k, l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$$l_{start}^{PRS}$$

is the first symbol of the DL PRS in the slot, which may be given by a higher-layer parameter DL-PRS-ResourceSymbolOffset. The time-domain size of the DL PRS resource, $$L_{PRS} \in \{2, 4, 6, 12\}$$

may be given by a higher-layer parameter DL-PRS-NumSymbols. A comb size $$K_{comb}^{PRS} \in \{2, 4, 6, 12\}$$

may be given by a higher-layer parameter transmissionComb. A combination $$\{L_{PRS}, K_{comb}^{PRS}\} \text{ of } L_{PRS} \text{ and } K_{comb}^{PRS}$$

may be one of {2, 2}, {4, 2}, {6, 2}, {12, 2}, {4, 4}, {12, 4}, {6, 6}, {12, 6} and/or {12, 12}. An RE offset $$k_{offset}^{PRs} \in \{0, 1, \ldots, K_{comb}^{PRS} - 1\}$$

may be given by combOffset. A frequency offset k' may be a function of $$l - l_{start}^{PRS}$$

as shown in Table 8.

TABLE 8

| | Symbol number within the downlink PRS resource $l - l_{start}^{PRS}$ | | | | | | | | | | | |
|---|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu} n_f + n_{s,f}^{\mu} - T_{offset}^{PRS} - T_{offset,res}^{PRS}\right) \bmod 2^{\mu} T_{per}^{PRS} \in \left\{iT_{gap}^{PRS}\right\}_{i=0}^{T_{rep}^{PRS}-1} \quad \text{[Equation 4]}$$

$$N_{slot}^{frame,\mu}$$

may be the number of slots per frame in the SCS configuration μ. $n_f$ may be a system frame number (SFN).

$$n_{s,f}^{\mu}$$

may be a slot number in a frame in the SCS configuration μ. A slot offset $$T_{offset}^{PRS} \in \{0, 1, \ldots, T_{per}^{PRS} - 1\}$$

may be given by a higher-layer parameter DL-PRS-ResourceSetSlotOffset. A DL PRS resource slot offset $$T_{offset,res}^{PRS}$$

may be given by a higher layer parameter DL-PRS-ResourceSlotOffset. A periodicity $$T_{per}^{PRS} \in \{4, 5, 8, 10, 16, 20, 32, 40, 64, 80, 160, 320, 640, 1280, 2560, 5120, 10240\}$$

may be given by a higher-layer parameter DL-PRS-Periodicity. A repetition factor $$T_{rep}^{PRS} \in \{1, 2, 4, 6, 8, 16, 32\}$$

may be given by a higher-layer parameter DL-PRS-ResourceRepetitionFactor. A muting repetition factor $$T_{muting}^{PRS}$$

may be given by a higher-layer parameter DL-PRS-MutingBitRepetitionFactor. A time gap $$T_{gap}^{PRS} \in \{1, 2, 4, 8, 16, 32\}$$

may be given by a higher-layer parameter DL-PRS-ResourceTimeGap.

2.3. UE Positioning Architecture

Figure 6:
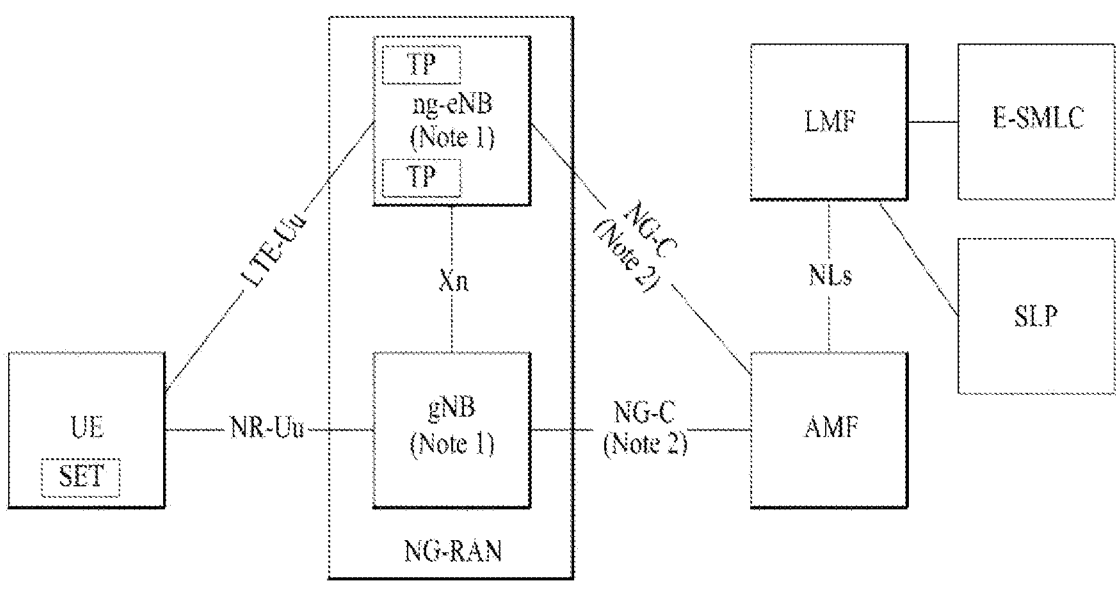
FIG. 6 illustrates an exemplary system architecture for measuring positioning of a UE to which various embodiments are applicable.

FIG. 6 illustrates an exemplary system architecture for measuring positioning of a UE to which various embodiments are applicable.

Referring to FIG. 6, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, BLUETOOTH™ beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 7:
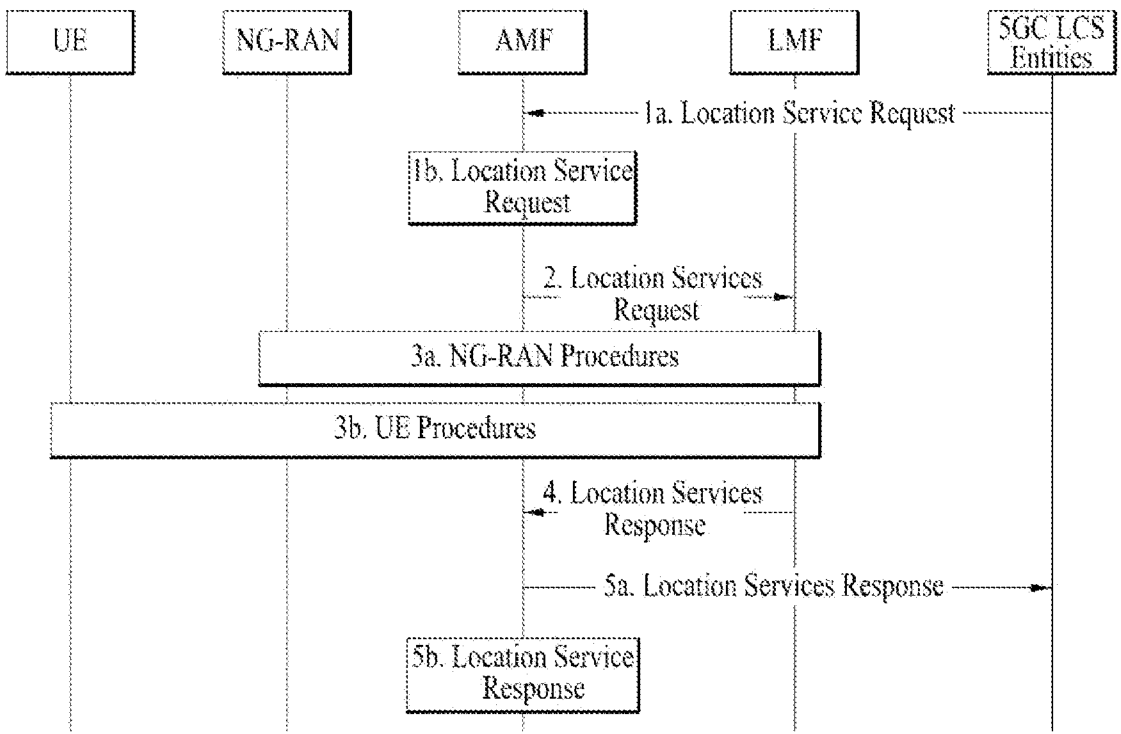
FIG. 7 illustrates an implementation example of a network for UE positioning.

FIG. 7 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 7. In other words, in FIG. 7, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 7. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 7 has been initiated by step 1a, the AMF may transfer the location service response to a 5GC entity such as a GMLC. If the procedure of FIG. 7 has been initiated by step 1b, the AMF may use the location service response in order to provide a location service related to an emergency call.

2.5. Positioning Protocol

LTE Positioning Protocol (LPP)

Figure 8:
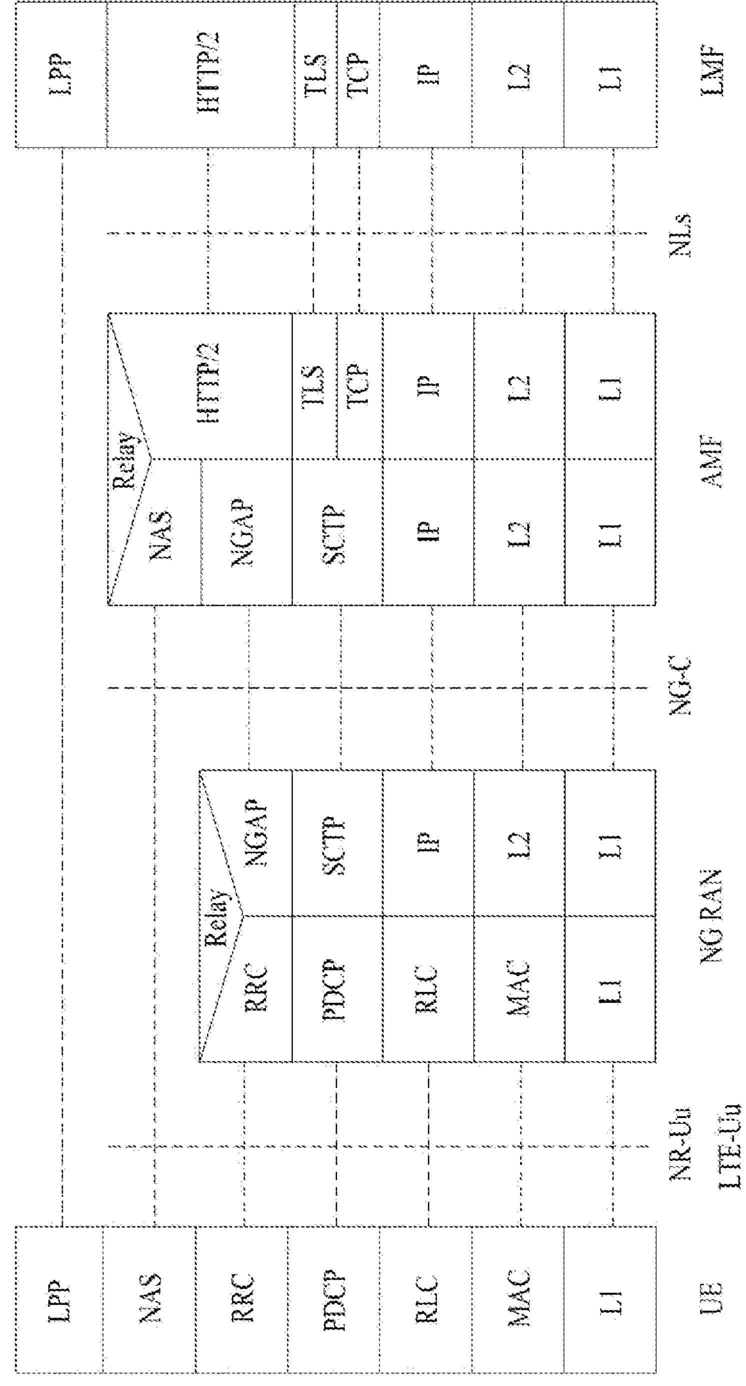
FIG. 8 is a diagram illustrating protocol layers for supporting LTE positioning protocol (LPP) message transmission, to which various embodiments are applicable.

FIG. 8 illustrates an exemplary protocol layer used to support LPP message transfer between an LMF and a UE. An LPP protocol data unit (PDU) may be carried in a NAS PDU between an AMF and the UE.

Referring to FIG. 8, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 9:
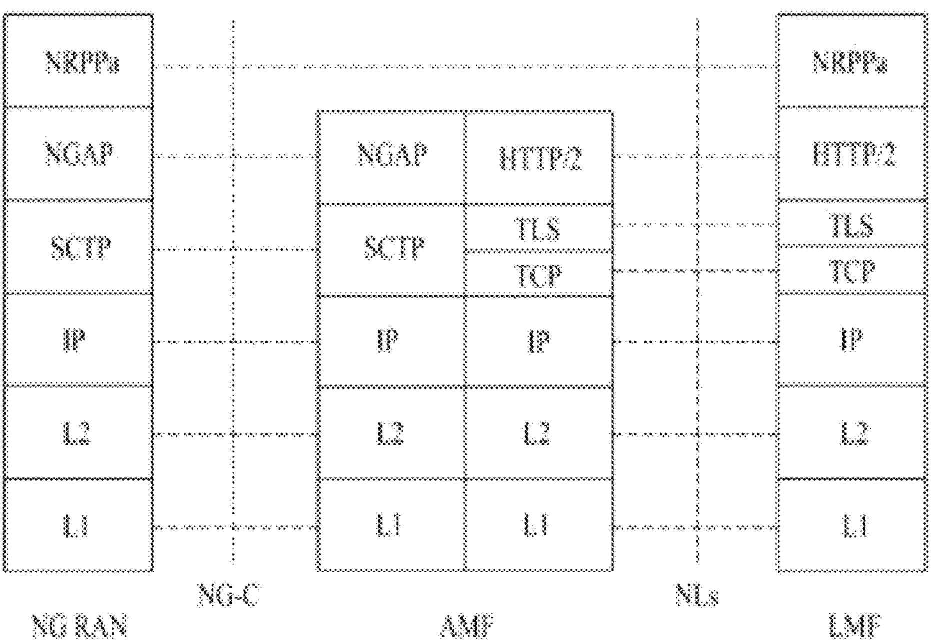
FIG. 9 is a diagram illustrating protocol layers for supporting NR positioning protocol a (NRPPa) protocol data unit (PDU) transmission, to which various embodiments are applicable.

FIG. 9 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, BLUETOOTH™ positioning, a TBS, uplink time difference of arrival (UTDOA) etc. Although any one of the positioning methods may be used for UE positioning, two or more positioning methods may be used for UE positioning.

OTDOA (Observed Time Difference Of Arrival)

Figure 10:
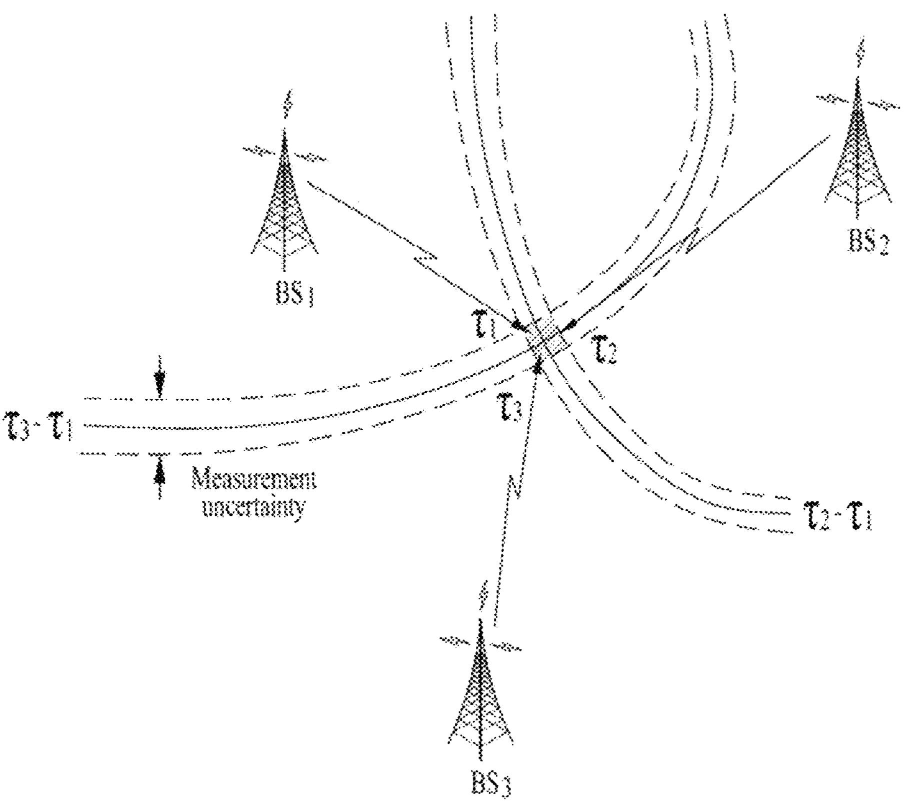
FIG. 10 is a diagram illustrating an observed time difference of arrival (OTDOA) positioning method, to which various embodiments are applicable.

FIG. 10 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

[Equation 5]

$$RSTDi_{,1} \frac{-\sqrt{(x_t - x_i)^2 + (y_t - y_i)^2}}{c} -$$

-continued $$\frac{\sqrt{(x_t - x_1)^2 + (y_f - y_1)^2}}{c} + (T_i - T_1) + (n_i - n_1)$$

In Equation 5, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i\text{-}T_1)$ is a transmission time offset between two TPs, referred to as "real time differences" (RTDs), and $n_i$ and $n_1$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

- UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io
- E-UTRAN measurement: ng-eNB Rx-Tx time difference, timing advance (TADV), and/or AoA Here, TADV may be divided into Type 1 and Type 2 as follows.

- $T_{ADV}$ Type 1=(ng-eNB Rx-Tx time difference)+(UE E-UTRA Rx-Tx time difference)
- TADV Type 2=ng-eNB Rx-Tx time difference AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 11:
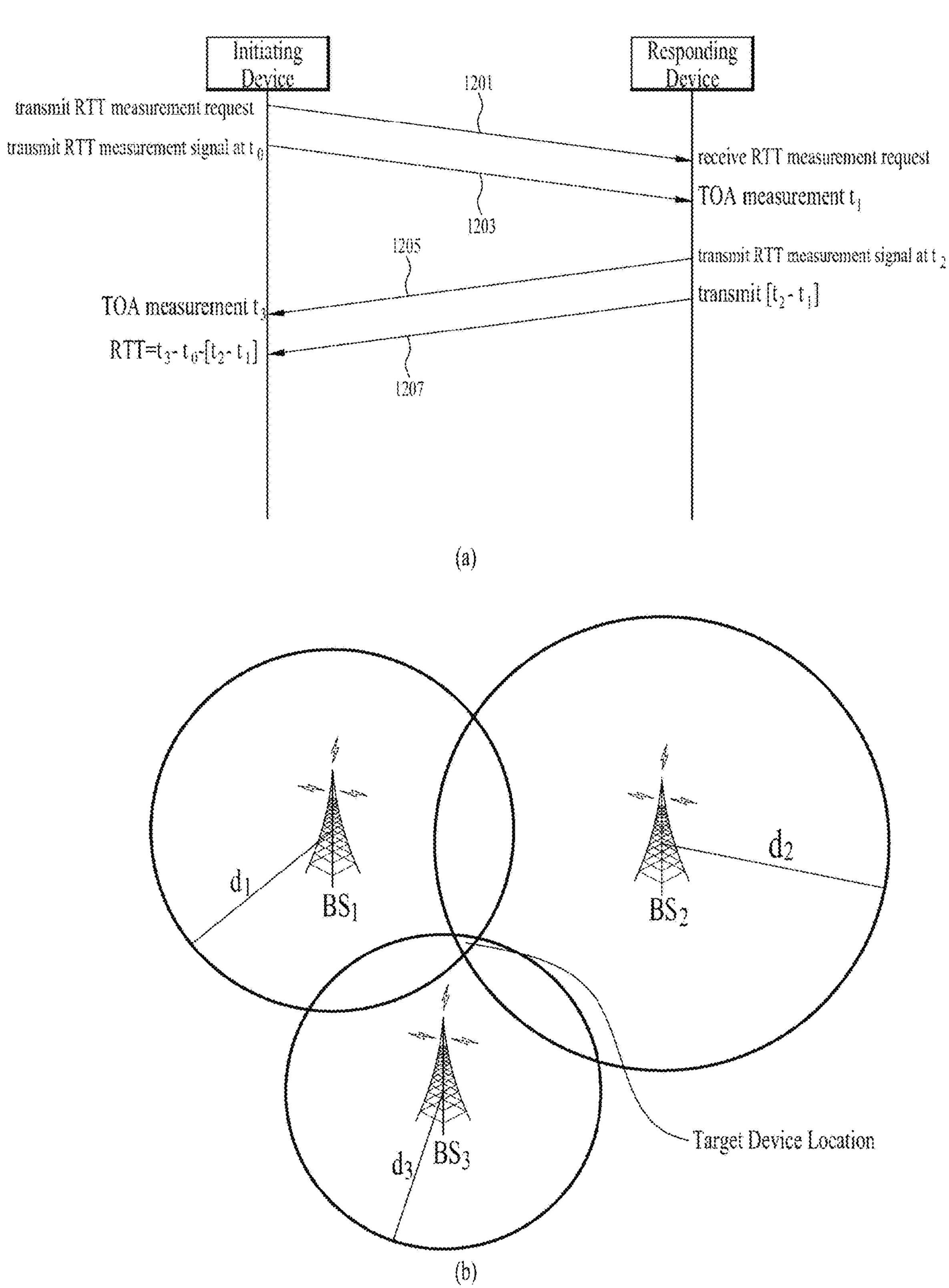
FIG. 11 is a diagram illustrating a multi-round trip time (multi-RTT) positioning method to which various embodiments are applicable.
Figure 12:
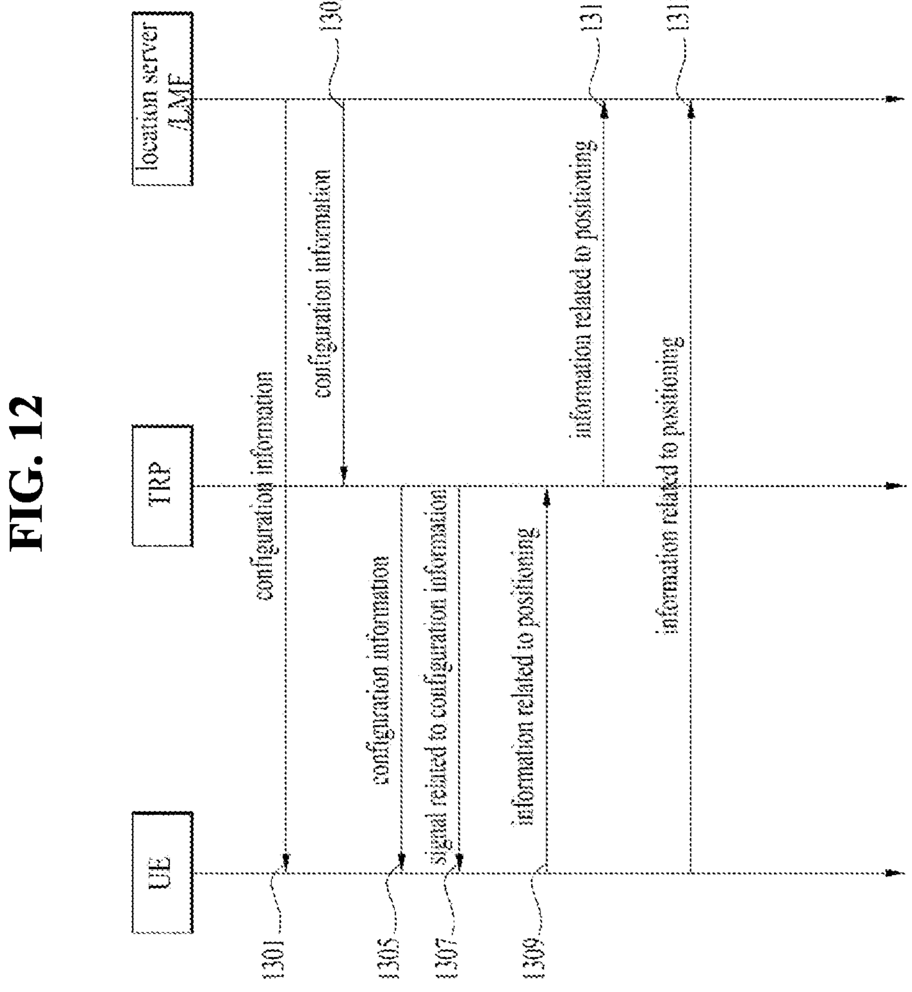
FIG. 12 is a simplified diagram illustrating a method of operating a UE, a transmission and reception point (TRP), a location server, and/or a location management function (LMF) according to various embodiments.

FIG. 11 is a diagram illustrating an exemplary multi-round trip time (multi-RTT) positioning method to which various embodiments are applicable.

Referring to FIG. 11(*a*), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2-t1], and the initiating device may receive the information and calculate an RTT by Equation 6. The information may be transmitted and received based on a separate signal or in the RTT measurement signal of operation 1305.

$$RTT = t_3 - \zeta_0 - [t_2 - t_1] \qquad \text{[Equation 6]}$$

Referring to FIG. 11(*b*), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

2.7. Sounding Procedure

In a wireless communication system to which various embodiments are applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 6 shows an exemplary SRS request field.

TABLE 6

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResource Set with an entry in aperiodicSRS-ResourceTriggerList set to 1 when triggered by DCI formats 0_1, 0_2, 1_1, and 1_2 | SRS resource set(s) configured with higher layer parameter usage in SRS-ResourceSet set to 'antennaSwitching' and resource Type in SRS-ResourceSet set to 'aperiodic' for a $1^{st}$ set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS-Resource Set set to 'antennaSwitching' and resource Type in SRS-ResourceSet set to 'apenodic' for a $2^{nd}$ set of serving cells configured by higher layers |

TABLE 6-continued

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResourceSet with an entry in aperiodicSRS-ResourceTriggerList set to 3 when triggered by DCI formats 0_1, 0_2, 1_1, and 1_2 | SRS resource set(s) configured with higher layer parameter usage in SRS-ResourceSet set to 'antenna Switching' and resourceType in SRS-ResourceSet set to 'aperiodic' for a 3$^{rd}$ set of serving cells configured by higher layers |

In Table 6 srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C

AOA (AoA): angle of arrival

CSI-RS: channel state information reference signal

LMF: location management function

NRPPa: NR positioning protocol a

OTDOA (OTDoA): observed time difference of arrival

PRS: positioning reference signal

RAT: radio access technology

RS: reference signal. Unless otherwise specified, the RS (resource) mentioned in the description of various embodiments may be understood as a CSI-RS (resource), a PRS (resource), a tracking reference signal (TRS) (resource), an SS/PBCH block, an SRS (MIMO SRS and/or positioning SRS) (resource), a PRACH, a UL RS (resource), and/or a sidelink RS (resource). However, the RS is not limited thereto.

RTT: round trip time

RSRP: reference signal received power

RSRQ: reference signal received quality

RSTD: reference signal time difference/relative signal time difference

Rx-Tx time difference: receive-transmit time difference (receive-transmit time difference/time difference between reception and transmission)

1) UE Rx-Tx time difference: According to various embodiments, a UE Rx-Tx time difference may be defined by $T_{UE-RX}-T_{UE-TX}$. According to various embodiments, $T_{UE-RX}$ denotes a timing at which a UE receives DL subframe (and/or frame/slot/symbol, etc.) #i from a positioning node, which may be defined by a first detected path in time. According to various embodiments, $T_{UE-TX}$ denotes a timing at which a UE transmits UL subframe (and/or frame/slot/symbol, etc.) #j closest in time to subframe (and/or frame/slot/symbol, etc.) #i received from a positioning node (where i and j are indices, each of which may have an integer value greater than or equal to 0). According to various embodiments, one or multiple DL PRS resources may be used to determine the start of one subframe (and/or frame/slot/symbol, etc.) on a first arrival path of the positioning node.

2) gNB Rx-Tx time difference: According to various embodiments, a gNB Rx-Tx time difference may be defined by $T_{gNB-RX}-T_{gNB-TX}$. According to various embodiments, $T_{gNB-RX}$ denotes a timing at which a positioning node receives UL subframe (and/or frame/slot/symbol, etc.) #i including a sounding reference signal (SRS) associated with a UE, which may be defined by a first detected path in time. According to various embodiments, $T_{gNB-TX}$ denotes a timing at which a positioning node transmits DL subframe (and/or frame/slot/symbol, etc.) #j closest in time to subframe (and/or frame/slot/symbol, etc.) #i received from a node (where i and j are indices, each of which may have an integer value greater than or equal to 0). According to various embodiments, one or multiple SRS resources for positioning may be used to determine the start of one subframe (and/or frame/slot/symbol, etc.) including an SRS. According to various embodiments, a gNB may be replaced with an eNB/base station (BS)/TRP, etc.

SINR: signal to interference plus noise ratio)

SNR: signal to noise ratio

SRS: sounding reference signal. According to various embodiments, the SRS may be used for UL channel estimation based on multi-input multi-output (MIMO) and positioning measurement. In other words, according to various embodiments, the SRS may include a normal SRS and a positioning SRS. According to various embodiments, the positioning SRS may be understood as a UL RS configured and/or used for UE positioning. According to various embodiments, the normal SRS is different from the positioning SRS. Specifically, the normal SRS may be understood as a UL RS configured and/or used for UL channel estimation (additionally or alternatively, the normal SRS may be understood as a UL RS configured and/or used for UL channel estimation and positioning). According to various embodiments, the positioning SRS may also be referred to as an SRS for positioning. In the description of various embodiments, the following terms: 'positioning SRS' and 'SRS for positioning' may be used interchangeably and understood to have the same meaning. According to various embodiments, the normal SRS may also be referred to as a legacy SRS, a MIMO SRS, an SRS for MIMO, or the like. In the description of various embodiments, the following terms: 'normal SRS', 'legacy SRS', 'MIMO SRS', and 'SRS for MIMO' may be used interchangeably and understood to have the same meaning. For example, the normal SRS and the positioning SRS may be separately configured/indicated. For example, the normal SRS and the positioning SRS may be configured/indicated by different information elements (IEs) of higher layers. For example, the normal SRS may be configured based on SRS-resource, and the positioning SRS may be configured based on SRS-PosResource. In the description of various embodiments, the positioning SRS may be understood as an exemplary UL PRS.

SS: synchronization signal

SSB: synchronization signal block

SS/PBCH: synchronization signal/physical broadcast channel

TA: timing advance/time advance

TDOA (TDoA): timing difference of arrival

TOA (ToA): time of arrival

TRP: transmission and reception point (TP: transmission point)

UTDOA (UTDoA): uplink time difference of arrival

In the description of various embodiments, the term "BS" may be understood as an umbrella term including a remote radio head (RRH), an eNB, a gNB, a TP, a reception point (RP), a relay, etc.

In the description of various embodiments, when it is said that something is more than/more than or equal to A, it may be interpreted to mean that the thing is more than or equal to/more than A.

In the description of various embodiments, when it is said that something is less than/less than or equal to B, it may be interpreted to mean that the thing is less than or equal to/less than B.

In the description of various embodiments, a network may refer to a BS/location server/LMF.

In the description of various embodiments, unless specifically stated otherwise, all UE operations may be configured/indicated by the BS/location server/LMF and/or defined by default with no separate configurations/indications.

In the description of various embodiments, line-of-sight (LoS) identification and LoS/NLOS (non-line-of-sight) identification may be used interchangeably and understood to have the same meaning.

Although various embodiments are described with an emphasis on a PRS, the PRS may be replaced with a CSI-RS, an SSB, an SRS for positioning, and the like. That is, the following embodiments may be applied to any RS for positioning, and the embodiments are not limited to the PRS.

In the description of various embodiments, a UE-based positioning method may relate to a method in which the UE directly calculates/obtains its own location/positioning information.

In the description of various embodiments, a UE-assisted positioning method may relate to the following method: the UE calculates/obtains and reports measurements related to UE location/positioning (e.g., values used by the BS/server (or location server)/LMF for UE positioning, and more particularly, measurement values for at least one of RSTD, AoA, AoD, RTT, ToA, etc.), and upon receiving the measurements, the network node (e.g., BS, server, LMF, etc.) calculates/obtains the location/positioning of the UE.

For UE positioning based on a positioning technique (e.g., DL-TDOA, UL-TDOA, etc.), the performance of the UE positioning may vary significantly depending on whether a LoS signal path exists between the BS and UE. Accordingly, a method/information capable of determining whether a signal transmitted and received by the UE/BS is LoS/NLOS may be necessary.

Various embodiments may relate to methods of discriminating/identifying whether there is a LoS/NLOS signal path for a signal transmitted from a specific transmitter. For example, considering that it is difficult to determine the first arriving signal path of a signal transmitted by one specific transmitter as LoS, methods of determining LoS/NLOS based on reception signals transmitted by multiple transmitters are proposed in various embodiments.

Figure 13:
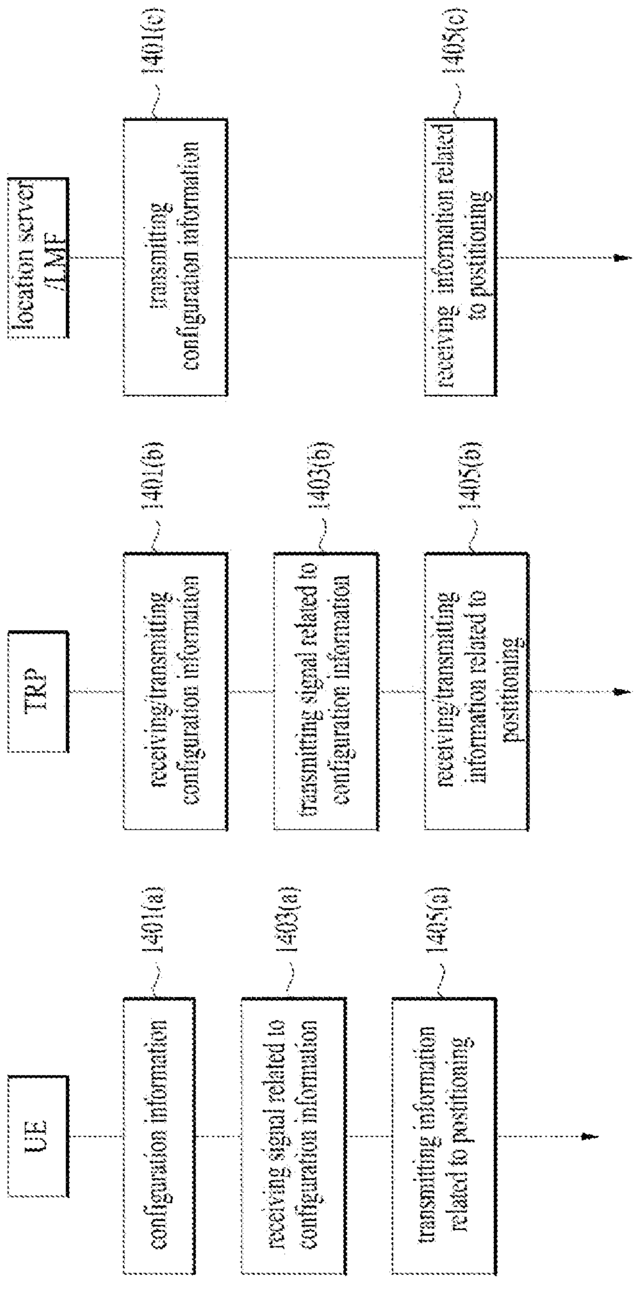
FIG. 13 is a simplified diagram illustrating a method of operating a UE, a TRP, a location server, and/or an LMF according to various embodiments.

FIG. 13 is a simplified diagram illustrating an operating method of a UE, a TRP, a location server, and/or an LMF according to various embodiments.

Referring to FIG. 13, in operation 1301 according to various embodiments, the location server and/or the LMF may transmit configuration information to the UE, and the UE may receive the configuration information.

In operation 1303 according to various embodiments, the location server and/or the LMF may transmit reference configuration information to the TRP, and the TRP may receive the reference configuration information. In operation 1305 according to various embodiments, the TRP may transmit the reference configuration information to the UE, and the UE may receive the reference configuration information. In this case, operation 1301 according to various embodiments may be omitted.

In contrast, operations 1303 and 1305 according to various embodiments may be omitted. In this case, operation 1301 according to various embodiments may be performed.

That is, operation 1301 according to various embodiments, and operations 1303 and 1305 according to various embodiments may be selectively performed.

In operation 1307 according to various embodiments, the TRP may transmit a signal related to the configuration information, and the UE may receive the signal related to the configuration information. For example, the signal related to the configuration information may be a signal for positioning of the UE.

In operation 1309 according to various embodiments, the UE may transmit a signal related to positioning to the TRP, and the TRP may receive the signal related to positioning. In operation 1311 according to various embodiments, the TRP may transmit the signal related to positioning to the location server and/or the LMF, and the location server and/or the LMF may receive the signal related to positioning.

In operation 1313 according to various embodiments, the UE may transmit the signal related to positioning to the location server and/or the LMF, and the location server and/or the LMF may receive the signal related to positioning. In this case, operations 1309 and 1311 according to various embodiments may be omitted.

In contrast, operation 1313 according to various embodiments may be omitted. In this case, operations 1309 and 1311 according to various embodiments may be performed.

That is, operations 1309 and 1311 according to various embodiments, and operation 1313 according to various embodiments may be selectively performed.

According to various embodiments, the signal related to positioning may be obtained based on the configuration information and/or the signal related to the configuration information.

Figure 14:
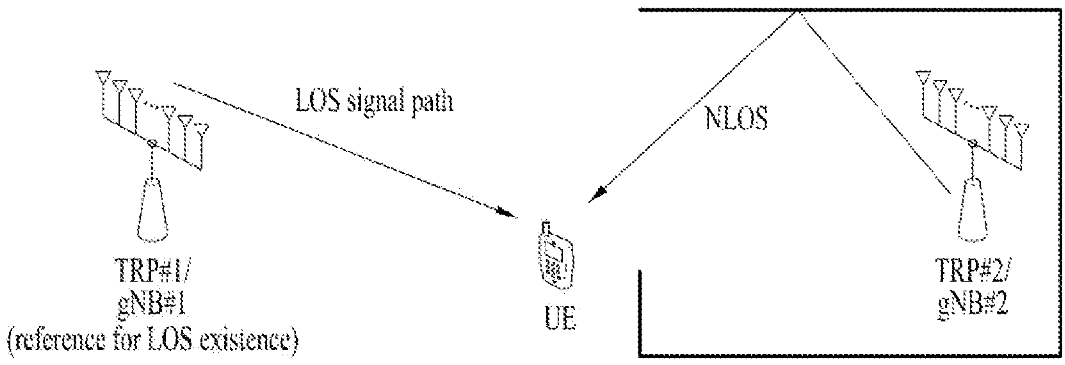
FIG. 14 is a diagram illustrating an example of a reference TRP/gNB and target TRP/gNB according to various embodiments.

FIG. 14 is a simplified diagram illustrating an operating method of a UE, a TRP, a location server, and/or an LMF according to various embodiments.

Referring to FIG. 14(*a*), in operation 1401(*a*) according to various embodiments, the UE may receive configuration information.

In operation 1403(*a*) according to various embodiments, the UE may receive a signal related to the configuration information.

In operation 1405(*a*) according to various embodiments, the UE may transmit information related to positioning.

Referring to FIG. 14(*b*), in operation 1401(*b*) according to various embodiments, the TRP may receive configuration information from the location server and/or the LMF and transmit the configuration information to the UE.

In operation 1403(*b*) according to various embodiments, the TRP may transmit a signal related to the configuration information.

In operation 1405(*b*) according to various embodiments, the TRP may receive information related to positioning and transmit the information related to positioning to the location server and/or the LMF.

Referring to FIG. 14(*c*), in operation 1401(*c*) according to various embodiments, the location server and/or the LMF may transmit configuration information.

In operation 1405(*c*) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. It may be understood by those of ordinary skill in the art that the various embodiments described below may be combined in whole or in part to implement other embodiments unless mutually exclusive.

Multipath mitigation techniques may be explored to improve positioning accuracy. For example, one or more of the following may be considered, which may be applied to DL positioning, UL positioning, and DL+UL positioning.

Application scenario and/or performance benefit of multipath mitigation technology Method/measurement/signaling for LoS/NLOS detection/identification Measurement to support multipath mitigation/utilization Procedure/signaling to support multipath mitigation/utilization Solution based on implementation with no additional specific method/measurement/procedure/signaling (e.g., outlier cancellation (rejection))

Various embodiments may relate to LoS/NLOS path determination techniques and/or LoS/NLOS discrimination methods.

When the UE is located based on a positioning technique (e.g., DL-TDOA and/or UL-TDOA), the performance of UE positioning may vary greatly depending on the presence or absence of the LOS signal path between the BS and UE, Observation A method of identifying the LoS/NLOS signal path based on polarization/polarity deformation/variation of a transmitted signal with polarization antenna(s) may be considered. However, such a method may be quite restrictive depending on accuracy and UE mobility, etc. It may be difficult to determine whether an RS resource (i.e., an RS resource corresponding to a PRS transmitted by a single TRP) is transmitted over the LoS path or is a scattered and/or reflected signal only by measuring the propagation time of a PRS transmitted from a single specific TRP.

Various embodiments may relate to methods of determining/discriminating LoS/NLOS for a signal received from a specific TRP/gNB/BS/cell based on signals received from multiple TRPs/gNBs/BSs/cells, instead of receiving a signal transmitted from a specific single TRP/gNB/BS/cell and determining/discriminating LoS/NLOS of the received signal based on the characteristics of the received signal.

Various embodiments may be applied to discrimination/determination of LoS/NLOS for a received signal from the perspective of the UE. Various embodiments may also be applied to discrimination/determination of LoS/NLOS for a received signal from the perspective of the BS. Various embodiments may be applied to sidelink. The UE may determine LoS/NLOS for a signal received from a specific TRP/gNB/BS/cell based on signals received from multiple TRPs/gNBs/BSs/cells. The BS may determine LoS/NLOS for a signal received from a specific UE based on signals received from multiple UEs. The UE may determine LoS/NLOS for a signal received from a specific UE based on signals received from multiple UEs. Various embodiments are described with an emphasis on discrimination/determination of LoS/NLOS for a received signal from the perspective of the UE, but the embodiments may also be applied to a BS, a UE in sidelink communication, and a specific device receiving a signal for positioning.

Proposal #1

According to various embodiments, the BS/location server may configure/indicate to the UE a window and/or threshold used as a reference for determining/discriminating LoS/NLOS for a DL RS (e.g., PRS, CSI-RS, SSB, etc.) transmitted from a specific TRP/BS. According to various embodiments, the window/threshold may be configured/indicated as an RSTD and/or time difference value between a specific criterion/reference TRP/gNB/BS/cell and a specific target TRP/gNB/BS/cell for LoS/NLOS determination.

According to various embodiments, the UE/location server/LMF may configure/indicate to the cell/BS/TRP a window and/or threshold used as a reference for determining/discriminating LoS/NLOS for a UL RS (e.g., SRS for positioning, etc.) transmitted from a specific UE. According to various embodiments, the window/threshold may be configured/indicated as an RSTD and/or time difference value between a specific reference UE and a specific target UE for LoS/NLOS determination.

According to various embodiments, the UE/BS/location server may configure/indicate to the UE a window and/or threshold used as a reference for determining/discriminating LoS/NLOS for a sidelink (SL) RS transmitted from a specific UE. According to various embodiments, the window/threshold may be configured/indicated as an RSTD and/or time difference value between a specific reference UE and a specific target UE for LoS/NLOS determination.

Hereinafter, various embodiments will be described with an emphasis on determination/discrimination of LoS/NLOS for a received signal from the perspective of the UE.

FIG. 14 is a diagram illustrating an example of a reference TRP/gNB and target TRP/gNB according to various embodiments.

Referring to FIG. 14, the reference TRP/gNB (TRP #1 or gNB #1) may be a TRP/gNB used by the UE to determine the presence or absence of LOS/NLOS for a specific TRP/gNB (TRP #2 or gNB #2), that is, a reference TRP/gNB in which the UE may assume that the LoS signal path exists. The UE may determine whether a signal received from TRP #2 or gNB #2 correspond to the LoS signal path or the NLOS signal path, based on methods based on the reference TRP/gNB according to various embodiments. It may be determined that a signal received after being reflected as shown in FIG. 14 corresponds to the NLOS signal path.

Reference TRP/gNB/BS/Cell

In the description of various embodiments, the reference TRP/gNB/BS/cell may refer to a TRP/gNB/BS/cell used by the UE to determine the presence or absence of LOS/NLOS for a specific TRP/gNB/BS/cell. According to various embodiments, the UE may assume that there is the LoS signal path with a fairly high probability (e.g., with a probability greater than or equal to a predetermined threshold) among signal paths between the reference TRP/gNB/BS/cell and the UE. According to various embodiments, the reference TRP/gNB/BS/cell may be TRP(s)/gNB(s)/BS(s)/cell(s) fairly close to the UE (for example, N TRPs/gNBs/BSs/cells closest to the UE among multiple TRPs/gNBs/BSs/cells or N TRPs/gNBs/BSs/cells each having a distance to the UE less than or equal to a predetermined threshold). According to various embodiments, the reference TRP/gNB/BS/cell may be one or multiple TRPs/gNBs/BSs/cells.

Target TRP/gNB/BS/Cell

In the description of various embodiments, a specific TRP/gNB/BS/cell for which the UE desires to measure/evaluate the presence or absence of the LoS signal path may be referred to as a target TRP/gNB/BS/cell.

According to various embodiments, the UE may not report a positioning measurement (e.g., RSTD(s), UE Rx-Tx time difference, etc.) for a specific TRP/gNB/BS/cell that is determined to be NLOS to the location server/BS. According to various embodiments, when the UE measures/calculates its own location based on obtained positioning measurements and TRP(s)/gNB(s) location information, the UE may exclude the positioning measurement for the specific TRP/gNB/BS/cell determined to be NLoS. According to various embodiments, the above UE operation may be configured/indicated by the BS/location server/LMF.

Effects

According to various embodiments, in the case of UE-based positioning, the LoS/NLOS signal path may be determined for a TRP exceeding a LoS/NLOS identification window/threshold. Thus, the location of the UE may be calculated by excluding NLOS, thereby improving positioning accuracy.

According to various embodiments, in the case of UE-assisted positioning, the UE may not report a positioning measurement for a TRP that exceeds the LoS/NLOS identification window/threshold to the location server/BS, thereby reducing reporting overhead.

To allow the UE to determine LoS/NLOS for a specific TRP, various embodiments propose methods of using a specific TRP/gNB/BS/cell serving as the reference.

Ideally, the UE may assume that a signal transmitted from a specific TRP/gNB/BS/cell always has the LoS signal path and the LoS signal path is capable of being used as the reference TRP/gNB/BS/cell. Hereinafter, a TRP will be described as an example, for convenience.

The UE itself may not determine whether the first-signal path of a signal transmitted from a specific TRP is a LoS component. When the RSTD and/or propagation time difference between the reference TRP and the specific target TRP exceeds a specific window/threshold, the network may configure/instruct the UE to determine/discriminate a signal received from the (target) TRP as the NLOS signal path.

Although the UE itself may determine the LoS/NLOS identification window/threshold, which may be limited. This will be explained in detail later.

Figure 15:
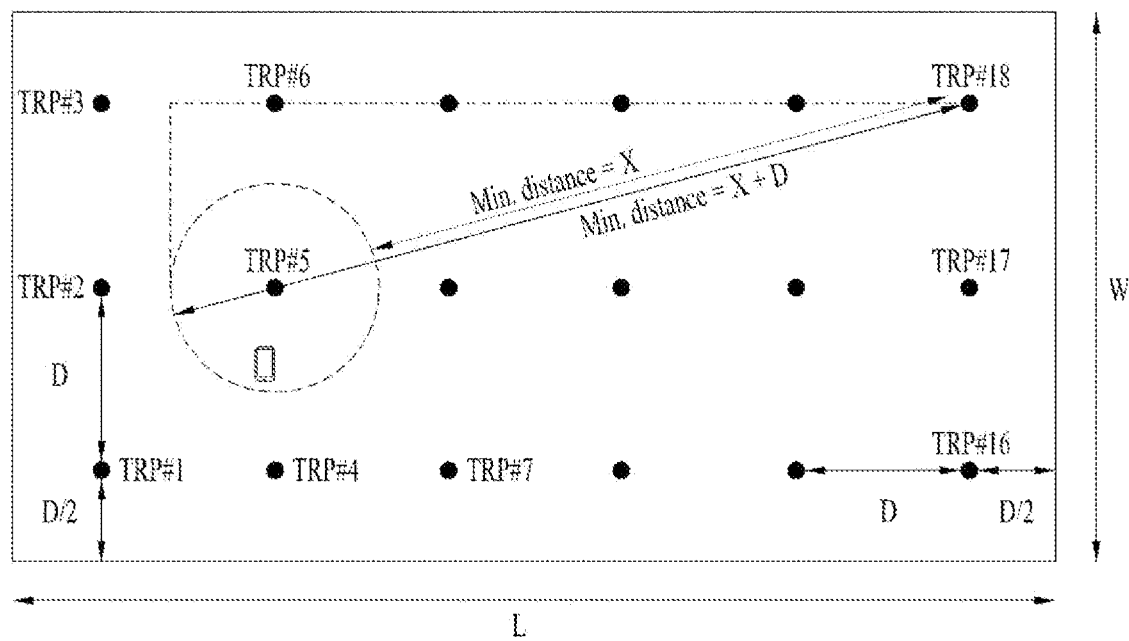
FIG. 15 is a diagram illustrating an exemplary wireless network having multiple TRPs deployed therein according to various embodiments.

FIG. 15 is a diagram illustrating an exemplary wireless network having multiple TRPs deployed therein according to various embodiments.

Figure 16:
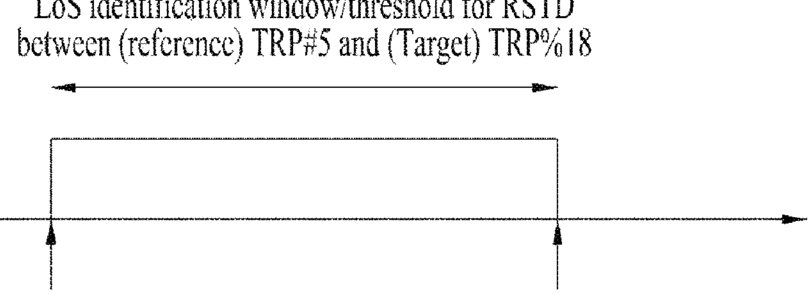
FIG. 16 is a diagram an exemplary window/threshold for line-of-sight/non-line-of-sight (LoS/NLoS) identification according to various embodiments.

FIG. 16 is a diagram an exemplary window/threshold for LoS/NLOS identification according to various embodiments. Specifically, FIG. 16 illustrates an exemplary window/threshold for LoS/NLOS identification when TRP #5 is the reference TRP and TRP #18 is the target TRP for LoS/NLOS identification.

In FIG. 16, D denotes the distance between adjacent TRPs (minimum distance between TRPs), X denotes the minimum possible distance between the UE and the target TRP on the assumption that the UE exists within a radius of D/2 with respect to the reference TRP, X+D denotes the maximum possible distance between the UE and the target TRP on the assumption that the UE exists within the radius D/2 with respect to the reference TRP, L denotes the horizontal length between multiple TRPs arranged at regular intervals (the distance between the two TRPs that are farthest apart horizontally+D), and W denotes the vertical length between multiple TRPs arranged at regular intervals (the distance between the two TRPs that are farthest apart vertically+D).

It will be described in more detail with reference to FIGS. 15 and 16.

For example, for two different TRPs, it may be assumed that TRP #5 is the reference TRP and TRP #18 is the target TRP for LoS/NLOS identification. For convenience of description, it may be assumed that different TRPs (a plurality of TRPs including two TRPs) are installed/arranged at regular intervals.

The UE may not know its location information. In this case, the UE may determine a specific reference to use the DL-TDOA technique based on measurements of PRS resources (e.g., propagation time, RSRP, SNR, SINR, etc.) received from multiple TRPs/gNBs in the vicinity thereof. The specific reference may be a TRP, which may be referred to as the reference TRP.

The BS/location server/LMF may configure/determine a LOS identification window/threshold for the reference TRP, TRP #5 and the target TRP, TRP #18 in consideration of the interval/distance between the TRPs.

Referring to FIG. 16, assuming that the UE is not more than D/2 away from the location of TRP #5, an RSTD measurement range that the UE may acquire for TRP #5 and TRP #18 may be determined as shown in Equation 7 in consideration of possible locations where the UE could be around TRP #5 and the maximum distance (X+D) and minimum distance (X) between the UE and TRP #18.

$$\frac{1}{c}(X - D/2) \leq RSTD \leq \frac{1}{c}(X + D/2) \qquad \text{[Equation 7]}$$

In Equation 7, the constant c denotes the speed of light, and D denotes the distance between adjacent TRPs (minimum distance between TRPs).

In Equation 7, the value of X (>=0) denotes the (possible) minimum distance between the UE and TRP #18, on the assumption that the UE exists within a radius of D/2 with respect to TRP #5.

According to various embodiments, when TRP #5 is the reference TRP and the target TRP is TRP #18, the location server/BS may determine and configure the RSTD range of Equation 7 as the LoS identification window/threshold for the UE.

Additionally/alternatively, according to various embodiments, the location server/BS may configure/indicate to the UE the value of $$\frac{1}{C}\left(X - \frac{D}{2}\right)$$

in Equation 7 as the LoS/NLOS identification window/threshold for TRP #18.

Similarly, the network may configure to the UE a LOS identification window/threshold for the target TRP, TRP #18 and the reference TRP, TRP #4. For example, if RSTD values measured by the UE for TRP #5 to TRP #18 are not within the window, the UE may determine that a timing measurement measured for TRP #18 is not the LoS signal.

The UE and/or location server may not know the current location of the UE. Therefore, the UE may need to perform LoS/NLOS identification for one specific target TRP based on multiple reference TRPs, instead of performing the LoS/NLOS identification for the target TRP based on one specific reference TRP.

The BS/location server may configure/indicate to the UE the LoS identification window/threshold for target TRP #18 for the following four cases.

Reference TRP #3—target TRP #18

Reference TRP #4—target TRP #18

Reference TRP #5—target TRP #18

Reference TRP #6—target TRP #18

The UE may consider one or more reference TRPs for the UE based on measurements (propagation time, RSRP, SNR, SINR, etc.) for PRS resources transmitted from TRPs #3/#4/#5/#6. The UE may use the configured windows/threshold for all of the reference TRP and the target TRP. This embodiment may be useful when the UE does not have any information on its current location, and when the UE calculates its location by itself according to the UE-based positioning method.

Since the UE does not know the current location of the UE, it may be difficult for the UE to calculate the reference/window/threshold by itself even if the UE knows the coordinates of a neighboring TRP/gNB. Therefore, it may be absolutely necessary for the BS/location server to directly/indirectly configure/indicate to the UE the LoS identification window/threshold for the reference TRP and target TRP.

According to various embodiments, the BS/location server/LMF may configure to the UE a LoS/NLOS identification window/threshold for a target TRP. A reference TRP may be introduced for the LoS/NLOS identification window/threshold, and one or more reference TRPs may be related to one target TRP. Thus, the LoS/NLOS identification window/threshold may be related to each of the one or more reference TRPs. The LoS/NLOS identification window/threshold may be configured/indicated as a measurement. The measurement may be configured/indicated based on the distance between TRPs included in a wireless network. The measurement may be configured/indicated based on the distance between the target TRP and the reference TRP. The measurement value may be configured/indicated based on a minimum possible distance and a maximum possible distance between the target TRP and the reference TRP. The minimum/maximum possible distance may be determined based on the distance between TRPs included in the wireless network. For example, when TRPs included in the wireless network are located at regular intervals, the minimum/maximum possible distance may be determined based on the corresponding intervals (D in the above description). When TRPs included in the wireless network are located at different intervals, a representative value may be determined as D based on the intervals between TRPs included in the wireless network. The representative value may be an average value, but the present disclosure is not limited thereto.

When the location server knows the approximate location of the target UE, but when the UE does not know the location of the UE at all, it may be useful for the location server to inform the UE of the approximate location, for example, information on the location at a previous point in time. In this case, the UE may easily know which TRP the UE is closest to and may determine/select the reference TRP relatively accurately.

When the UE knows its approximate location and, when the UE knows the locations of TRPs s by being provided from the network, the UE may autonomously determine the LoS identification window/threshold proposed in various embodiments.

In the description of various embodiments described above, it is described that the LoS/NLOS identification window/threshold is configured and used based on information on the locations of TRPs/BSs. However, there may be a case where it is difficult to configure the LoS/NLOS identification window based on information the location of a TRP/BS. For example, when the UE knows the geographic location of TRPs/gNBs and roughly knows its own location, the UE may determine the window by itself in limited environments, and thus, the UE may need help from the network.

Figure 17:
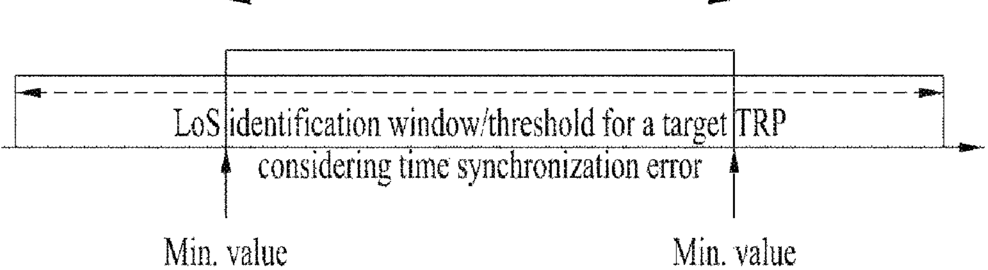
FIG. 17 is a diagram illustrating an exemplary window/threshold for LoS/NLOS identification according to various embodiments.

FIG. 17 is a diagram illustrating an exemplary window/threshold for LoS/NLOS identification according to various embodiments. Specifically, FIG. 17 illustrates an exemplary window/threshold for LoS/NLOS identification in consideration of a time synchronization error (delta).

According to various embodiments, when there is a time synchronization error between different TRPs/gNBs, the window may need to be configured by reflecting the time synchronization error. Referring to FIG. 17, an extended window/threshold may be introduced by considering the time synchronization error in the above-described LoS identification window. According to various embodiments, the LoS identification window may be extended by correcting each of the minimum and maximum values of the LoS/NLOS identification window/threshold based on a correction value obtained by considering the time synchronization error.

According to various embodiments, information on the time synchronization error may be provided from the network. Additionally/alternatively, the UE may obtain the time synchronization error with the help of the network.

Figure 18:
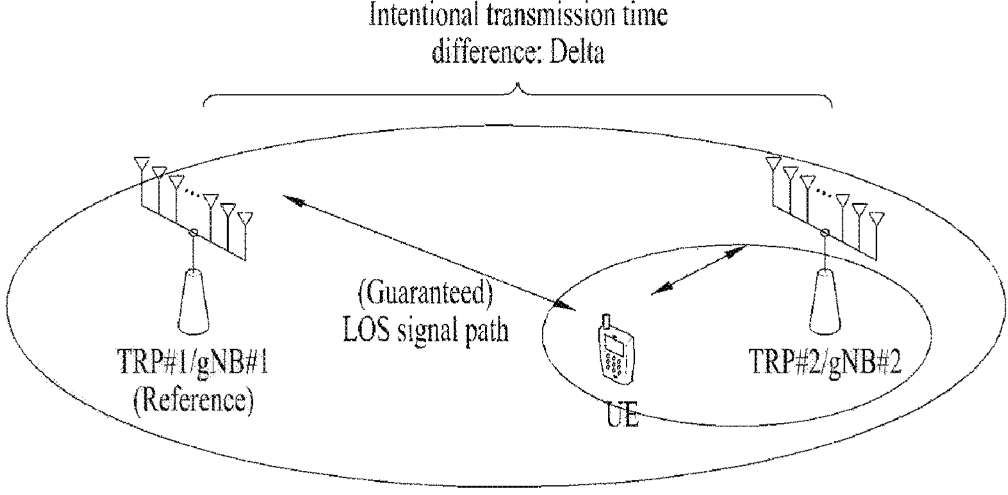
FIG. 18 is a diagram illustrating an exemplary heterogeneous wireless network according to various embodiments.

FIG. 18 is a diagram illustrating an exemplary heterogeneous wireless network according to various embodiments.

Figure 19:
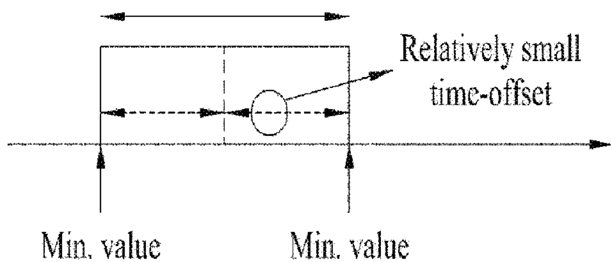
FIG. 19 is a diagram illustrating an exemplary window/threshold for LoS/NLOS identification according to various embodiments.

FIG. 19 is a diagram illustrating an exemplary window/threshold for LoS/NLOS identification according to various embodiments. Specifically, FIG. 19 illustrates an exemplary window/threshold for LoS/NLOS identification in a heterogeneous wireless network.

Referring to FIG. 18, a heterogeneous wireless network where macro-cells and micro/femto cells coexist may be considered. TRP #1/gNB #1 may be a macro BS, and TRP #2/gNB #2 may be a femto BS.

The UE may receive signals from the macro BS and femto BS. When the UE belongs to the serving area of the specific femto BS in such a heterogeneous wireless network, the UE may be farther away from the macro BS than the femto BS. The macro BS may intentionally delay and transmit a signal by a specific time compared to a signal from the femto BS so that the UE may receive the signals transmitted from the femto BS and macro BS at similar reception times (to maintain the same DL RX timing). In this case, it may be difficult to determine the LoS/NLOS identification window only with the geographical locations of TRP #1 and TRP #2 and/or the distance difference between TRP #1 and TRP #2 in FIG. 18.

In FIG. 19, assuming that the UE receives signals from a macro BS and a micro/femto BS at the same time ideally, a LoS/NLOS identification window/threshold may be determined/configured/indicated as a fairly small time offset (smaller than a predetermined threshold), regardless of the geographical location of the BS. For example, a window/threshold configured based on a specific BS may be corrected based on the time offset in order to configure a window/threshold for another BS.

According to various embodiments, the LoS/NLOS identification window/threshold may be determined/configured/used in consideration of an intentional transmission delay between the TRP and BS. According to various embodiments, the network may inform the UE of an intentional transmission time difference/delay between the BS and TRP and/or an inherent time synchronization error between the BS and TRP to allow the UE to properly configure the LoS/NLoS identification window/threshold.

According to various embodiments, the UE may be configured with a LoS/NLoS identification window/threshold (e.g., window/threshold-(#k, #p)) for the reference TRP, TRP #k and the target TRP, TRP #p by the network through higher layer signaling such as LPP/RRC, etc. According to various embodiments, the UE may use various windows/thresholds configured for the reference TRP, TRP #k and the target TRP, TRP #p as the reference varies.

According to various embodiments, when the UE selects one or multiple specific reference TRPs and reports the one or multiple specific reference TRPs to the BS/location server, the BS/location server may configure/indicate to the UE LoS identification windows for the specific reference TRPs and several target TRP(s) in order to reduce signaling overhead. According to various embodiments, when the UE reports the specific reference TRPs, the BS/location server may additionally configure/indicate windows/thresholds for various reference TRPs in consideration of multiple TRPs around the UE.

According to various embodiments, the reference TRP may be selected by the UE and/or indicated by the network. In the description of various embodiments described above, it is considered to determine LoS/NLOS of other gNB(s)/TRP(s) by configuring a specific TRP as the reference.

In the description of various embodiments described above, a specific PRS resource set and/or a specific PRS resource may be used as the reference, instead of using the reference TRP. Additionally/alternatively, according to various embodiments, a specific TRP and a PRS resource and/or a PRS resource set transmitted by the TRP may be configured/indicated as the reference.

A LOS identification window/threshold for the target TRP, TRP #k and the reference (TRP #k+PRS resource and/or PRS resource set) may be configured/indicated. Additionally/alternatively, according to various embodiments, a specific UE may be used/employed as the reference, instead of using the reference TRP.

According to various embodiments, multiple reference TRPs and multiple windows/thresholds may be used for a specific single target TRP. According to various embodiments, the network may instruct/configure the UE to determine NLOS if all windows/thresholds are not satisfied. Additionally/alternatively, if one or more specific L (>=1) windows/thresholds/references are not satisfied, the network may instruct/configure the UE to determine NLoS.

Proposal #2

According to various embodiments, the BS/location server may configure/indicate to the UE a window/threshold used as a reference for determining/discriminating LoS/NLOS for a DL RS (e.g., PRS, CSI-RS, SSB, etc.) transmitted from a specific TRP/BS.

According to various embodiments, the window/threshold may be configured/indicated as an RTT and/or UE Rx-Tx time difference measurement value for a specific target TRP/gNB for LoS/NLOS determination. According to various embodiments, the BS/location server may provide the UE with a gNB (BS) Rx-Tx time difference measurement value for the specific target TRP/gNB so that the UE is capable of calculating the RTT value.

In Proposal #2 according to various embodiments, the UE may need to calculate the current location of the UE by operating in the UE-based positioning mode. Proposal #2 may be useful when the UE does not know its approximate location, but when the location server knows the approximate location of the UE. According to various embodiments, the location server may properly know the location of the UE due to UE positioning at a previous point in time, and thus, the location server is capable of roughly determining within which range the RTT value between the UE and the specific TRP is. According to various embodiments, the location server may configure to the UE a threshold/window for the RTT and/or UE Rx-Tx time difference value for the target TRP based on this information. If the window/threshold is exceeded, the UE can recognize that the measurement is performed over the NLOS signal path rather than the LoS signal path.

Proposal #3

According to various embodiments, the location server/BS may configure/indicate to the UE an appropriate LoS/NLOS identification window/threshold in order to allow the UE to properly determine/select a reference TRP/gNB. The window/threshold of Proposal #3 is to determine the reference TRP/gNB, which may be different from those described above. Additionally/alternatively, according to various embodiments, the location server/BS may inform the UE of the cell radius and/or coverage of the reference TRP/gNB. Alternatively, the UE may know in advance the cell radius or coverage of the reference TRP/gNB/cell.

According to various embodiments, the UE may measure a propagation time and calculate the distance between the TRP and the UE. According to various embodiments, when the UE measures the propagation time, the propagation time of the first arriving signal path among signals received from the TRP may be used as the reference. According to various embodiments, the UE may calculate the distance from the propagation time. If the distance exceeds the radius/coverage of the TRP/gNB, the UE may determine that the signal received from the TRP is received over the NLOS signal path rather than the LoS signal path.

Although only the reference TRP is described in Proposal #3, various embodiments may be equally applied to other target TRPs/gNBs.

Figure 20:
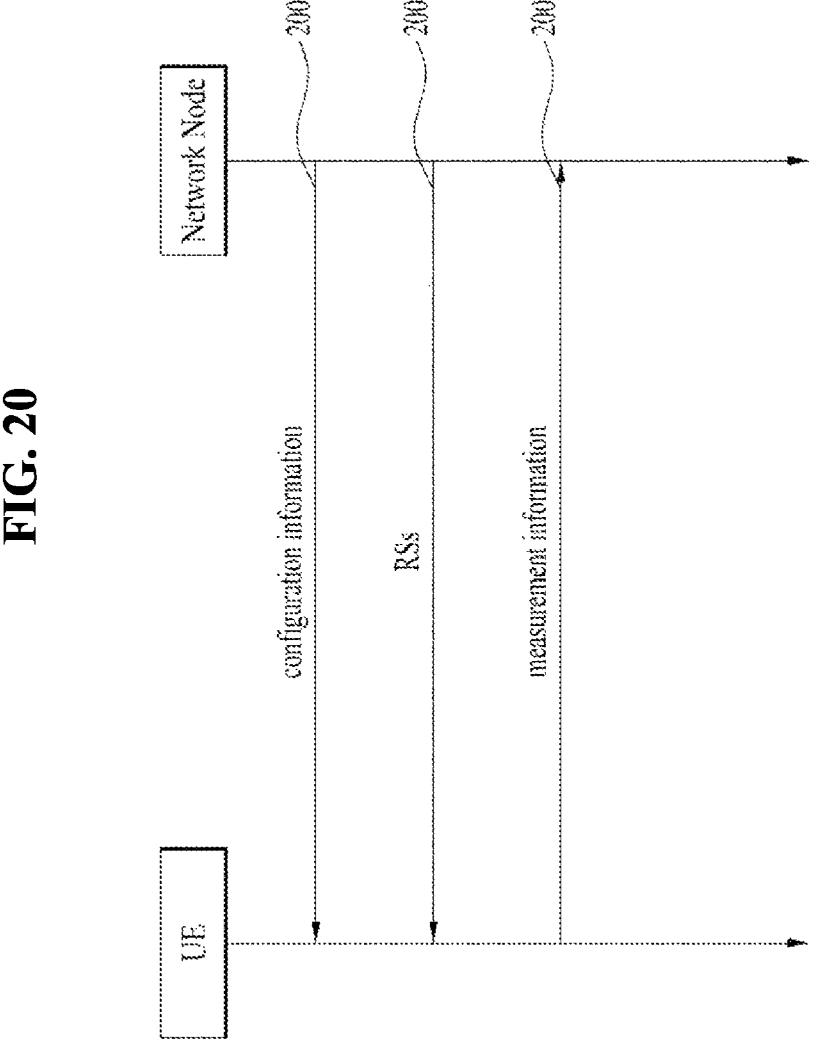
FIG. 20 is a diagram schematically illustrating a method of operating a UE and a network node according to various embodiments.

FIG. 20 is a diagram schematically illustrating a method of operating a UE and a network node according to various embodiments.

Figure 21:
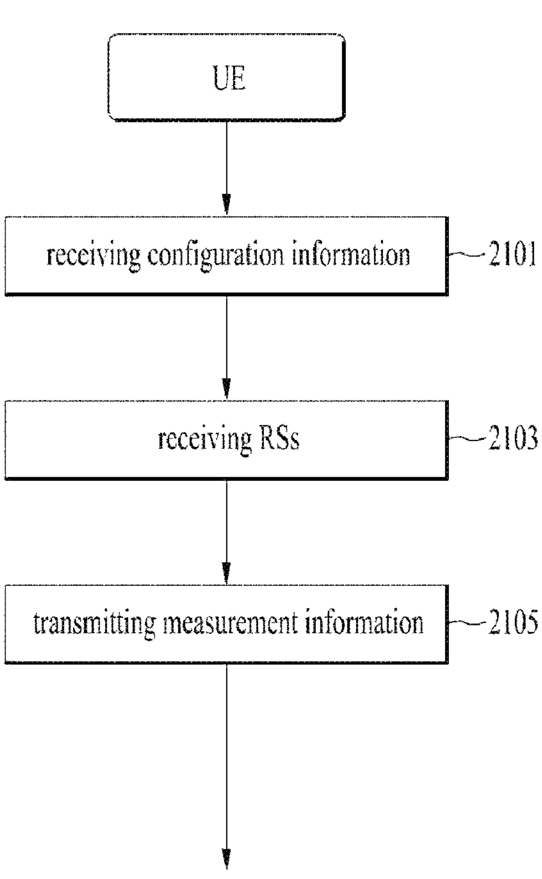
FIG. 21 is a flowchart illustrating a method of operating a UE according to various embodiments.

FIG. 21 is a flowchart illustrating a method of operating a UE according to various embodiments.

Figure 22:
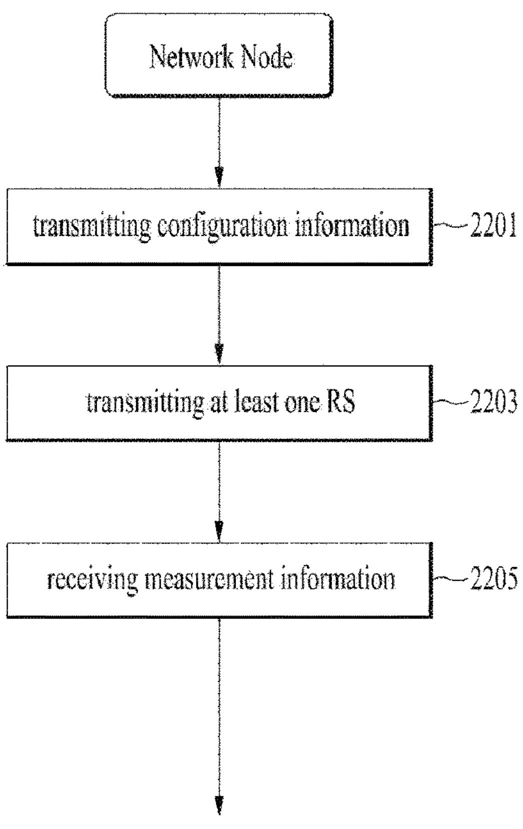
FIG. 22 is a flowchart illustrating a method of operating a network node according to various embodiments.

FIG. 22 is a flowchart illustrating a method of operating a network node according to various embodiments. For example, the network node may be a TP, a BS, a cell, a location server, an LMF, and/or any device performing the same operation.

Referring to FIGS. 20 to 22, in operations 2001, 2101, and 2201 according to various embodiments, the network node may transmit configuration information for positioning, and the UE may receive the configuration information for positioning.

In operations 2003, 2103, and 2203 according to various embodiments, the network node may transmit one or more RSs for positioning, and the UE may receive a plurality of RSs from a plurality of TPs including the network node.

In operations 2005, 2105, and 2205 according to various embodiments, the UE may transmit measurement information, and the network node may receive the measurement information.

According to various embodiments, to transmit the measurement information, whether a measurement obtained based on one or more RSs received from a specific TP among the plurality of TPs is related to a LOS signal path may be determined depending on whether the measurement is included in a LOS identification window.

According to various embodiments, the LoS identification window may be obtained based on the specific TP and a reference for the LoS identification window.

The operations of the UE and/or network node according to various embodiments may be explained and performed based on the details described in Sections 1 to 3.

It is obvious that each of the examples of the proposed methods may also be included as one embodiment, and thus each example may be regarded as a kind of proposed method. Although the proposed methods may be implemented independently, some of the proposed methods may be combined (or merged) for implementation. In addition, it may be regulated that information on whether the proposed methods are applied (or information on rules related to the proposed methods) needs to be transmitted from the BS to the UE in a predefined signal (e.g., a physical layer signal, a higher layer signal, etc.).

4. Exemplary Device Configurations for Implementing Various Embodiments

4.1. Exemplary Device Configurations to Which Various Embodiments Are Applied FIG. 23 is a diagram illustrating a device for implementing various embodiments.

Figure 23:
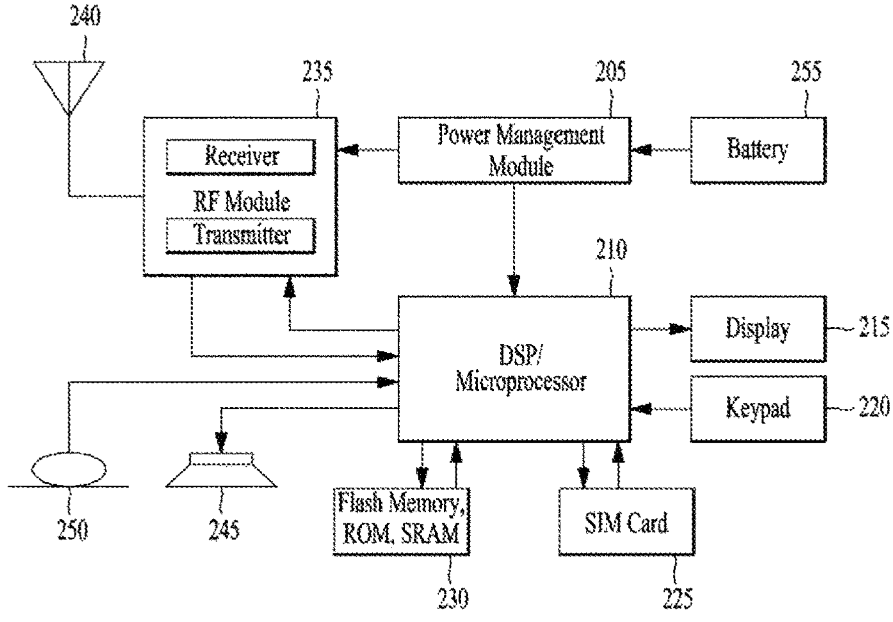
FIG. 23 is a diagram illustrating a device for implementing various embodiments.

The device illustrated in FIG. 23 may be a UE, a BS (e.g., eNB, gNB, or TP), and/or a location server (or LMF) that is adapted to perform the above-described mechanisms. Alternatively, the device may be any device for performing the same operation.

Referring to FIG. 23, the device may include a digital signal processor (DSP)/microprocessor 210 and a radio frequency (RF) module (transceiver) 235. The DSP/microprocessor 210 may be electrically connected to the transceiver 235 and configured to control the transceiver 235. The device may further include a power management module 205, a battery 255, a display 215, a keypad 220, a subscriber identity module (SIM) card 225, a memory device 230, an antenna 240, a speaker 245, and an input device 250, depending on the designer's choice.

In particular, the device shown in FIG. 23 shows a UE including a receiver 235 configured to receive a request message from a network and a transmitter 235 configured to transmit transmission/reception timing information to the network. The receiver and transmitter may constitute the transceiver 235. The UE may further include the processor 210 connected to the transceiver 235.

In addition, the device shown in FIG. 23 may represent a network device including a transmitter 235 configured to transmit a request message to a UE and a receiver 135 configured to receive transmission/reception timing information from the UE. The receiver and transmitter may constitute the transceiver 235. The network device may further include the processor 210 connected to the transmitter and receiver. The processor 210 may be configured to calculate latency based on the transmission/reception timing information.

According to various embodiments, a processor included in a UE (or a communication device included in the UE), a BS (or a communication device included in the BS), and/or a location server (or a communication device included in the location server) may be configured to operate as follows by controlling a memory.

According to various embodiments, the UE, BS, or location server may include: at least one transceiver; at least one memory; and at least one processor connected to the at least one transceiver and the at least one memory. The at least one memory may be configured to store instructions that cause the at least one processor to perform the following operations.

The communication device included in the UE, BS, or location server may be configured to include the at least one processor and the at least one memory. The communication device included in the UE, BS, or location server may be configured to include the at least one transceiver. When the communication device does not include the at least one transceiver, the communication device may be configured to be connected to the at least one transceiver.

The TP, BS, cell, location server, LMF, and/or any device performing the same operation may be referred to as a network node.

According to various embodiments, the at least one processor included in the UE (or at least one processor of the communication device included in the UE) may be configured to: receive configuration information for positioning; receive a plurality of RSs for the positioning from a plurality of TPs based on the configuration information; and transmit measurement information in response to the plurality of RSs.

According to various embodiments, the at least one processor included in the UE may be configured to determine whether a measurement obtained based on one or more RSs received from a specific TP among the plurality of TPs is related to a LoS signal path, depending on whether the measurement is included in a LoS identification window, to transmit the measurement information.

According to various embodiments, the LoS identification window may be obtained based on the specific TP and a reference for the LoS identification window.

According to various embodiments, the at least one processor included in the TP (network node) (or at least one processor of the communication device included in the TP (network node)) may be configured to: transmit configuration information for positioning; transmit one or more RSs related to the configuration information; and receive measurement information in response to the one or more RSs.

According to various embodiments, whether a measurement obtained based on one or more RSs received from a specific TP among a plurality of TPs including the TP is related to a LoS signal path may be determined depending on whether the measurement is included in a LoS identification window, According to various embodiments, the LoS identification window may be obtained based on the specific TP and a reference for the LoS identification window.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to Which Various Embodiments Are Applied

Various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
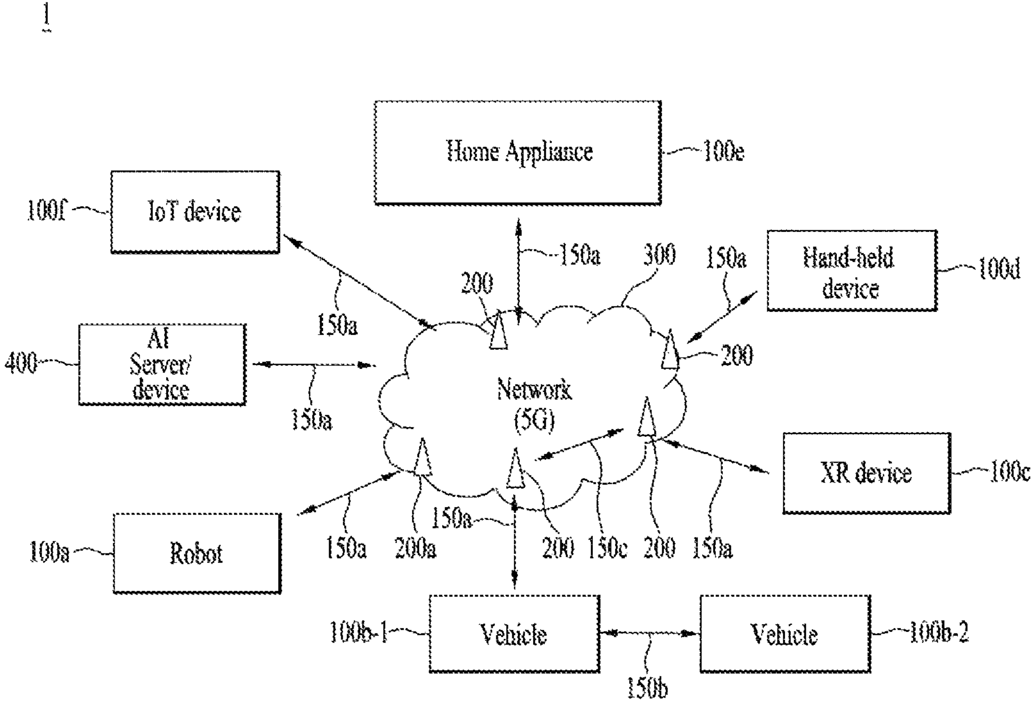
FIG. 24 illustrates an exemplary communication system to which various embodiments are applied.

FIG. 24 illustrates an exemplary communication system to which various embodiments are applied.

Referring to FIG. 24, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

Example of Wireless Device to which Various Embodiments are Applied

Figure 25:
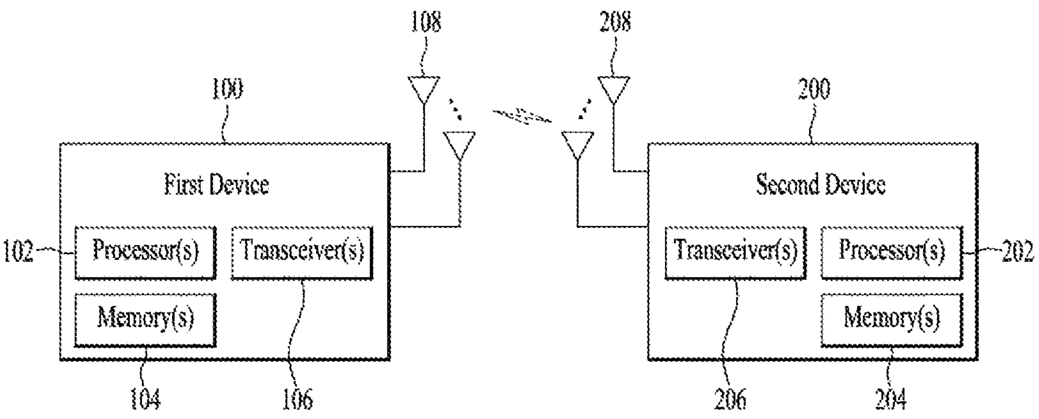
FIG. 25 illustrates exemplary wireless devices to which various embodiments are applicable.

FIG. 25 illustrates exemplary wireless devices to which various embodiments are applicable.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause one or more processors operably coupled to the one or more memories to perform operations according to various embodiments or implementations.

According to various embodiments, a computer-readable storage medium may store one or more instructions or computer programs which, when executed by one or more processors, cause the one or more processors to perform operations according to various embodiments or implementations.

According to various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations.

Example of Using Wireless Device to which Various Embodiments are Applied

Figure 26:
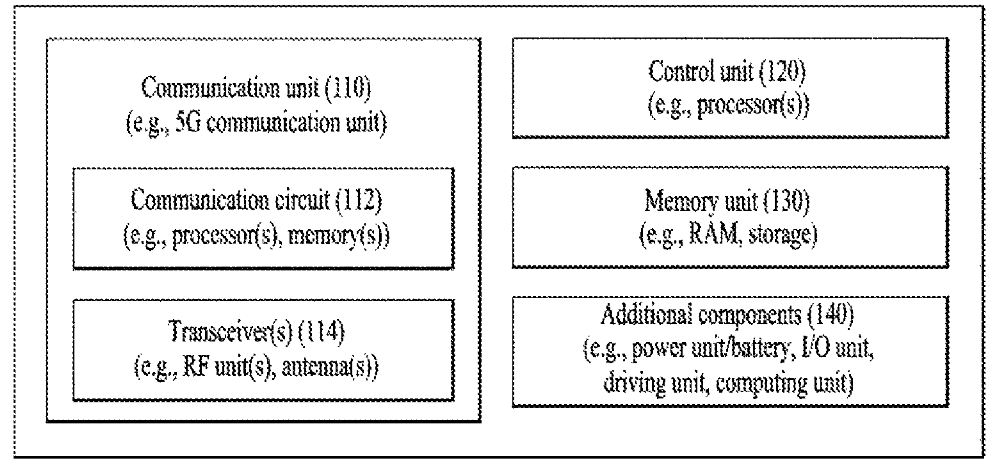
FIG. 26 illustrates other exemplary wireless devices to which various embodiments are applied.

FIG. 26 illustrates other exemplary wireless devices to which various embodiments are applied. The wireless devices may be implemented in various forms according to a use case/service (see FIG. 24).

Referring to FIG. 26, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 24), the vehicles (100*b*-1 and 100*b*-2 of FIG. 24), the XR device (100*c* of FIG. 24), the hand-held device (100*d* of FIG. 24), the home appliance (100*e* of FIG. 24), the IoT device (100*f* of FIG. 24), a digital broadcast terminal, a hologram device, a public safety device, an MTC device, a medicine device, a Fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Example of Portable Device to which Various Embodiments are Applied

Figure 27:
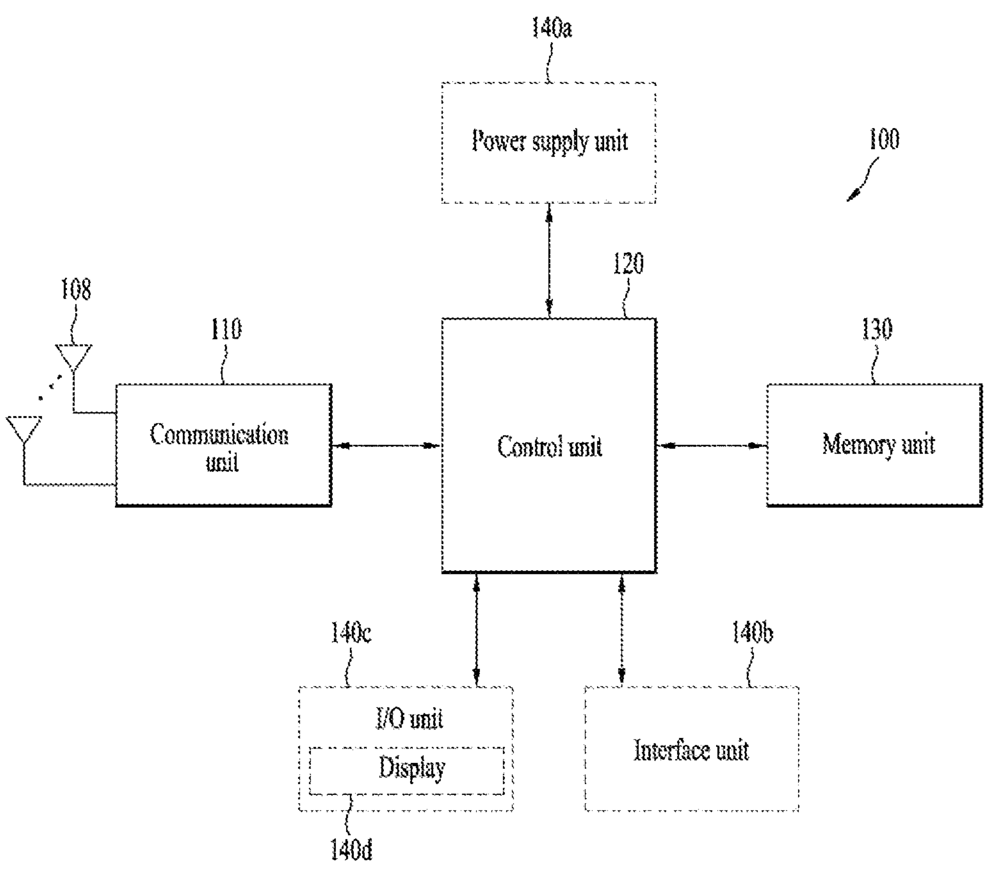
FIG. 27 illustrates an exemplary portable device to which various embodiments are applied.

FIG. 27 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 27, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Example of Vehicle or Autonomous Driving Vehicle to which Various Embodiments are Applied FIG. 28 illustrates an exemplary vehicle or autonomous driving vehicle to which various embodiments are applied. The vehicle or autonomous driving vehicle may be implemented as a mobile robot, a car, a train, a manned/unmanned aerial vehicle (AV), a ship, or the like.

Referring to FIG. 28, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, BLUETOOTH™, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method comprising:

receiving, by a user equipment (UE), configuration information for positioning;

performing, by the UE, measurements for positioning reference signals (PRSs) from transmission points (TPs) based on the configuration information; and transmitting, by the UE, a measurement report based on the measurements for the PRSs, wherein the configuration information includes information related to a line-of-sight (LoS) identification window, and wherein the measurement report includes information related to whether the measurements are performed based on the LoS identification window.

2. The method of claim 1, wherein the configuration information comprises at least one of:

one or more reference TPs;

one or more reference PRS resource sets; or one or more reference PRS resources.

3. The method of claim 1, wherein the information related to the LoS identification window includes information regarding a time synchronization error between the TPs, and
wherein the LoS identification window is configured based on the time synchronization error.

4. The method of claim 1, wherein based on the measurements being performed based on the LoS identification window, the information included in the measurement report is set to a first value related to a LOS signal path, and
wherein based on the measurements not performed in the LoS identification window, the information included in the measurement report is set to a second value related to a non-line-of-sight (NLoS) signal path.

5. A user equipment (UE) comprising:
a transceiver; and
at least one processor connected to the transceiver,
wherein the at least one processor is configured to:
receive configuration information for positioning;
performing measurements for positioning reference signals (PRSs) from transmission points (TPs) based on the configuration information; and
transmit a measurement report based on the measurements for the PRSs,
wherein the configuration information includes information related to a line-of-sight (LoS) identification window, and
wherein the measurement report includes information related to whether the measurements are performed based on the LoS identification window.

6. The UE of claim 5, wherein the configuration information comprises at least one of:
one or more reference TPs;
one or more reference PRS resource sets; or
one or more reference PRS resources.

7. The UE of claim 5, wherein the at least one processor is configured to communicate with at least one of a mobile terminal, a network, or an autonomous vehicle.

8. A method comprising:
transmitting, to a user equipment (UE) by a base station (BS), configuration information for positioning; and
receiving, from the UE by the BS, a measurement report regarding positioning reference signals (PRSs) of transmission points (TPs),
wherein the configuration information includes information related to a line-of-sight (LoS) identification window, and
wherein the BS determines, using information included in the measurement report, whether the measurements are performed by the UE based on the LoS identification window.

9. A base station (BS) comprising:
a transceiver; and
at least one processor connected to the transceiver,
wherein the at least one processor is configured to:
transmit, to a user equipment (UE), configuration information for positioning; and
receive, from the UE, a measurement report regarding positioning reference signals (PRSs) of transmission points (TPs),
wherein the configuration information includes information related to a line-of-sight (LoS) identification window, and
wherein the BS determines, using information included in the measurement report, whether the measurements are performed by the UE based on the LoS identification window.

10. The method of claim 1, wherein one or more measured values obtained from the measurements are included in the measurement report based on that the measurements are performed based on the LoS identification window.

* * * * *